United States Patent
Gallo

(10) Patent No.: US 12,092,364 B1
(45) Date of Patent: Sep. 17, 2024

(54) TECHNOLOGIES FOR FIREBOXES OR INCINERATORS

(71) Applicant: Andrew Gallo, Modesto, CA (US)

(72) Inventor: Andrew Gallo, Modesto, CA (US)

( * ) Notice: Subject to any disclaimer, the term of this patent is extended or adjusted under 35 U.S.C. 154(b) by 0 days.

(21) Appl. No.: 18/591,589

(22) Filed: Feb. 29, 2024

Related U.S. Application Data

(60) Provisional application No. 63/461,382, filed on Apr. 24, 2023.

(51) Int. Cl.
*F24F 9/00* (2006.01)
*B62D 63/06* (2006.01)

(52) U.S. Cl.
CPC .............. *F24F 9/00* (2013.01); *B62D 63/061* (2013.01); *B62D 63/062* (2013.01)

(58) Field of Classification Search
CPC ........ F24F 9/00; B62D 63/061; B62D 63/062
USPC .......................................... 454/188
See application file for complete search history.

(56) References Cited

U.S. PATENT DOCUMENTS

| | | | |
|---|---|---|---|
| 3,785,303 A * | 1/1974 | Hopkins | F23G 5/40 110/215 |
| 4,756,258 A | 7/1988 | Gilbert | |
| 5,050,509 A * | 9/1991 | Mormino | F23G 5/00 110/235 |
| 5,415,113 A * | 5/1995 | Wheeler | F23G 5/40 110/310 |
| 6,536,360 B2 | 3/2003 | O'Connor | |
| 6,766,750 B2 | 7/2004 | O'Connor | |
| 7,004,088 B2 | 2/2006 | Ford | |
| 7,063,027 B2 | 6/2006 | O'Connor | |
| 7,503,268 B2 | 3/2009 | O'Connor | |
| 7,895,956 B2 | 3/2011 | O'Connor | |
| 8,528,540 B2 * | 9/2013 | Marple | F24C 3/002 126/540 |
| 9,644,501 B2 | 5/2017 | O'Connor et al. | |
| 10,801,738 B2 * | 10/2020 | Haynes | F24H 15/345 |
| 10,948,183 B2 * | 3/2021 | Ragnarsson | F23G 5/002 |
| 11,326,779 B2 * | 5/2022 | Ragnarsson | F23G 5/027 |
| 11,661,551 B1 | 5/2023 | O'Connor | |
| 11,662,092 B2 | 5/2023 | O'Connor | |
| 2006/0201406 A1 | 9/2006 | O'Connor | |
| 2012/0235423 A1 | 9/2012 | O'Connor | |
| 2023/0250955 A1 | 8/2023 | O'Connor et al. | |

OTHER PUBLICATIONS

Air Burners Technology, The Wayback machine—https://web.archive.org/web/20220816075425/https://airburners.com/ (Aug. 16, 2022), 3 pages.

* cited by examiner

*Primary Examiner* — Avinash A Savani
*Assistant Examiner* — Dana K Tighe
(74) *Attorney, Agent, or Firm* — DENTONS US LLP

(57) ABSTRACT

A firebox having upper and lower manifolds with a double wall structure extending between the manifolds and providing fluid communication between the manifolds and cooling to the walls. The upper manifold has blades directing a curtain of air over and down into an interior box defined by an enclosing interior wall of the double wall structure.

12 Claims, 24 Drawing Sheets

Side Flow Diagram

Back View

Front View

Isometric View

Top Down Section View

Front Section View

Fig. 11 Heat Diverter Section View

Side Flow Diagram

Front Flow Diagram

Fig. 18 Trailer Tongue Expanded View

Back Wall Expanded View

Side Wall Expanded View

Diverter Expanded View

Jack Roller Expanded View

Drive System Expanded View

TECHNOLOGIES FOR FIREBOXES OR INCINERATORS

REFERENCE TO PRIOR APPLICATION

This application claims priority to and the benefit of the earlier filing date of U.S. Provisional Patent Application No. 63/461,382 filed Apr. 24, 2023, which is fully incorporated herein to the extent permitted by law.

TECHNICAL FIELD

This disclosure generally relates to combustion apparatus such as fireboxes and incinerators. More specifically, it relates to open-air combustion apparatus.

SUMMARY

Disclosed herein are one or more inventions relating to fireboxes or incinerators, referred to herein generically as fireboxes. While such fireboxes can be used to incinerate many types of combustible material, advantageously, biomass, including branches and other parts of trees and plants, can be consumed with minimal or minimized emission of smoke and with more complete combustion.

In an embodiment, a firebox comprises:
a manifold structure comprising an upper manifold within which air can flow, a lower manifold within which air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure;
a fireside wall secured to an interior side of the manifold structure;
an outer wall secured to an exterior side of the manifold structure; and
a fan in fluid communication with the manifold structure, wherein,
the fireside wall and the outer wall are spaced apart from each other and define cells between them and between the columns,
the cells are in fluid communication with the lower manifold and the upper manifold and are capable of channeling air flowing from the lower manifold to the upper manifold, and
a portion of the upper manifold includes openings on an interior side thereof which produce an air curtain over the interior space when air is communicated from the fan into the manifold structure.

In an embodiment, the firebox further comprises fins within the cells, the fins extending along direct between the lower manifold and the upper manifold, the fins being secured to the fireside wall and serving to channel air flowing in the cells and to dissipate heat from the fireside wall to the air flowing in the cells.

In an embodiment, the firebox further comprises a trailer hitch structure attached to the manifold structure and one or more sleeves attached to the manifold structure, the one or more sleeves capable of receiving one or more axels or spindles of at least two wheels.

In an embodiment, the firebox further comprises one or more steel rollers which can be adjusted to lift or lower the firebox relative to ground and which allow for trailering of the firebox along the ground.

In an embodiment, the outer wall comprises a plurality of outer panels that are removably secured to the manifold structure.

In an embodiment, the outer panels are removably secured to the columns.

In an embodiment, the fireside wall comprises a plurality of fireside panels that are permanently secured to the manifold structure.

In an embodiment, the fireside panels are secured to the columns.

In an embodiment, the interior space is open to ground.

In an embodiment, the firebox further comprises a first pulley attached to an axle of the fan, a second pulley with another axle, a belt engaging both the first pulley and the second pulley, and a mechanical power input on the another axle via which mechanical power can be transferred to the first pulley via the second pulley.

In an embodiment, the fireside wall, outer wall, and manifold structure are made of steel.

In an embodiment, the plurality of columns include tubular columns which are in fluid communication with both the upper manifold and the lower manifold.

These and other features and aspects are described in greater detail below with reference to the accompanying drawings.

BRIEF DESCRIPTION OF THE DRAWINGS

The accompanying drawings, which are incorporated in and constitute a part of this specification, illustrate an implementation of the system disclosed herein, together with the description, explain the advantages and principles of the disclosed system. In the drawings.

DETAILED DESCRIPTION

Figure 1:
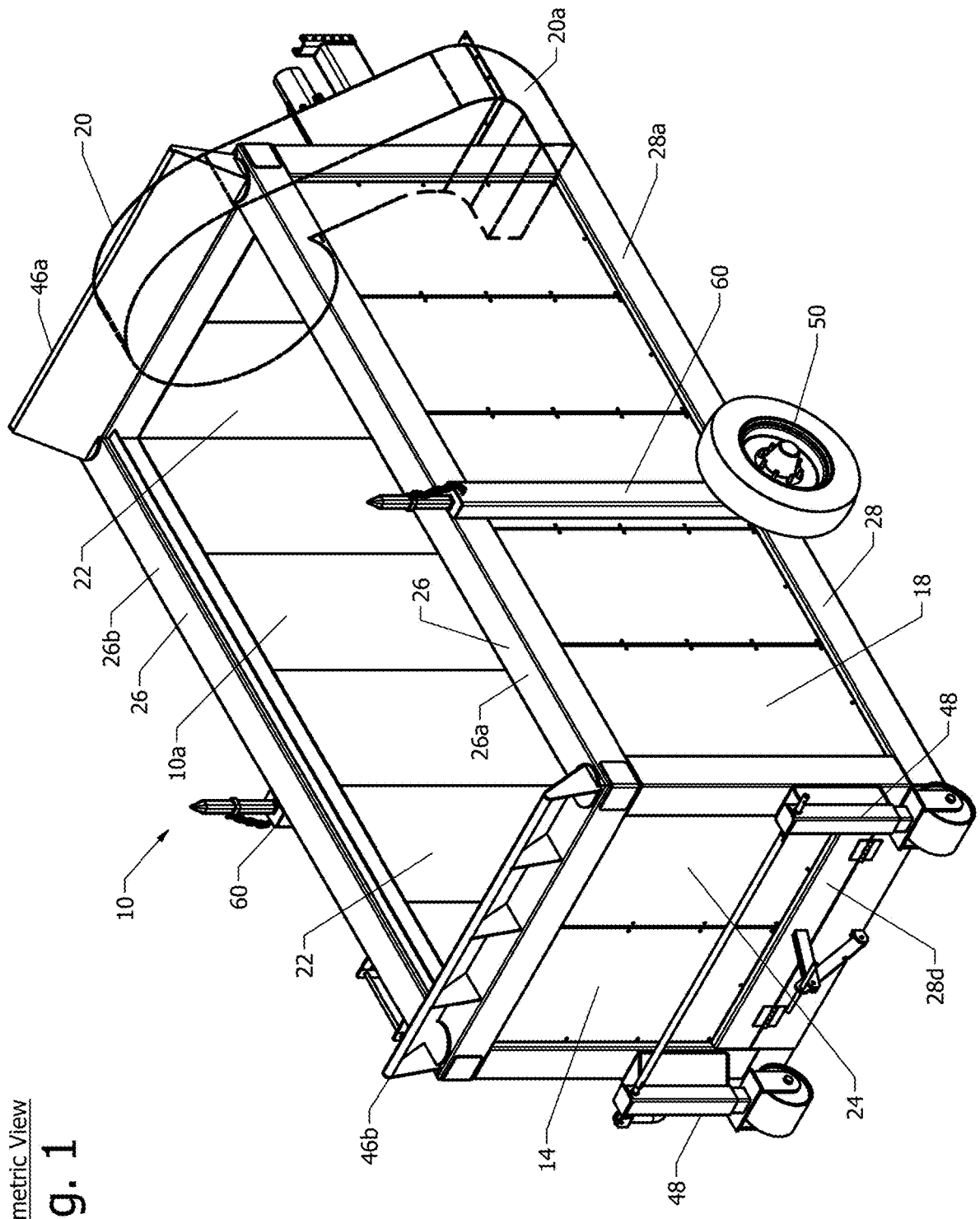
FIG. 1 is a first isometric view of a firebox embodying principles disclosed herein looking at a back end and left side thereof.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, the term "and/or" means either or both in the case of two items separated by the term, or, in the case of more than two items, that items recited before and after the term may be included individually, together, or in any combination.

As mentioned above, the FIGS. comprise different views of a firebox embodying principles disclosed herein and components thereof. The term "firebox" is used generically to also refer to incinerators and any other apparatus for combusting materials, preferably in the outdoors.

For the purposes of this disclosure, a length dimension x extends a first direction, the x-direction, a width dimension y extends in a second direction, the y-direction, that is perpendicular to the first direction, and a height direction z extends in a third direction, the z-direction, that is orthogonal to each of the first and second directions. The z-direction is also a vertical direction and the x-direction and the y-direction are horizontal directions.

Figure 11:
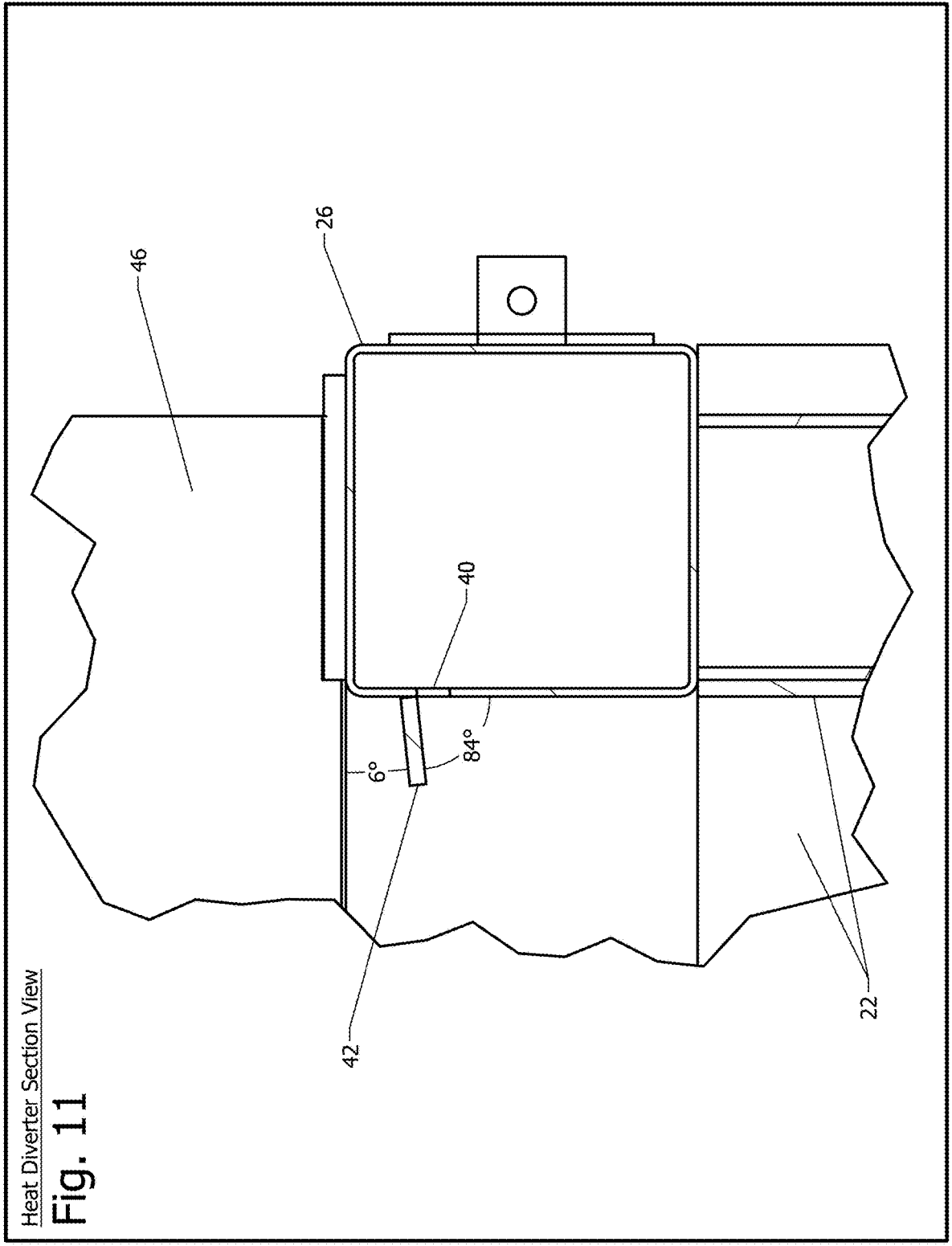
FIGS. 11 and 12 show an interior of the firebox of FIG. 1 including an air curtain generating structure.
Figure 12:
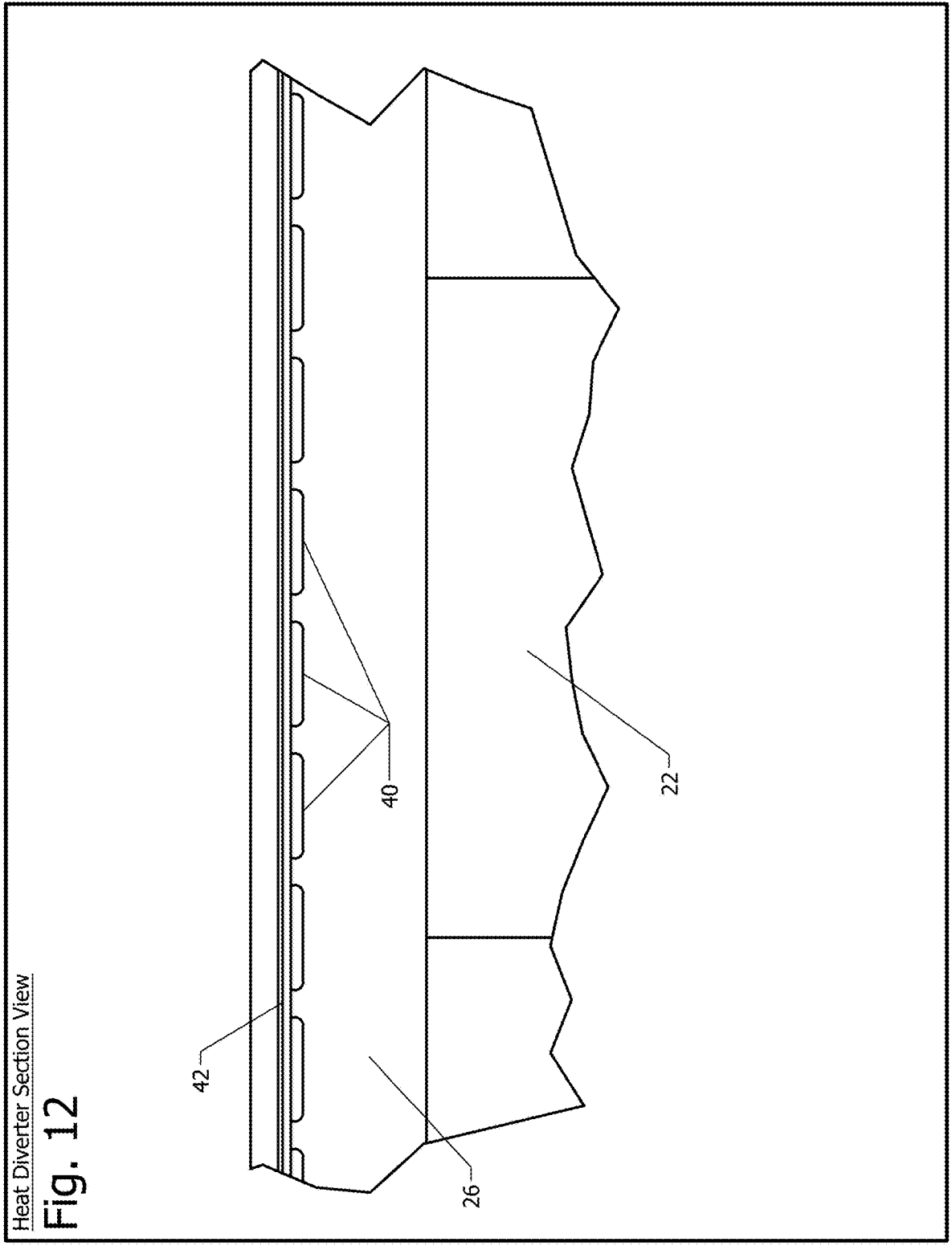
Figure 13:
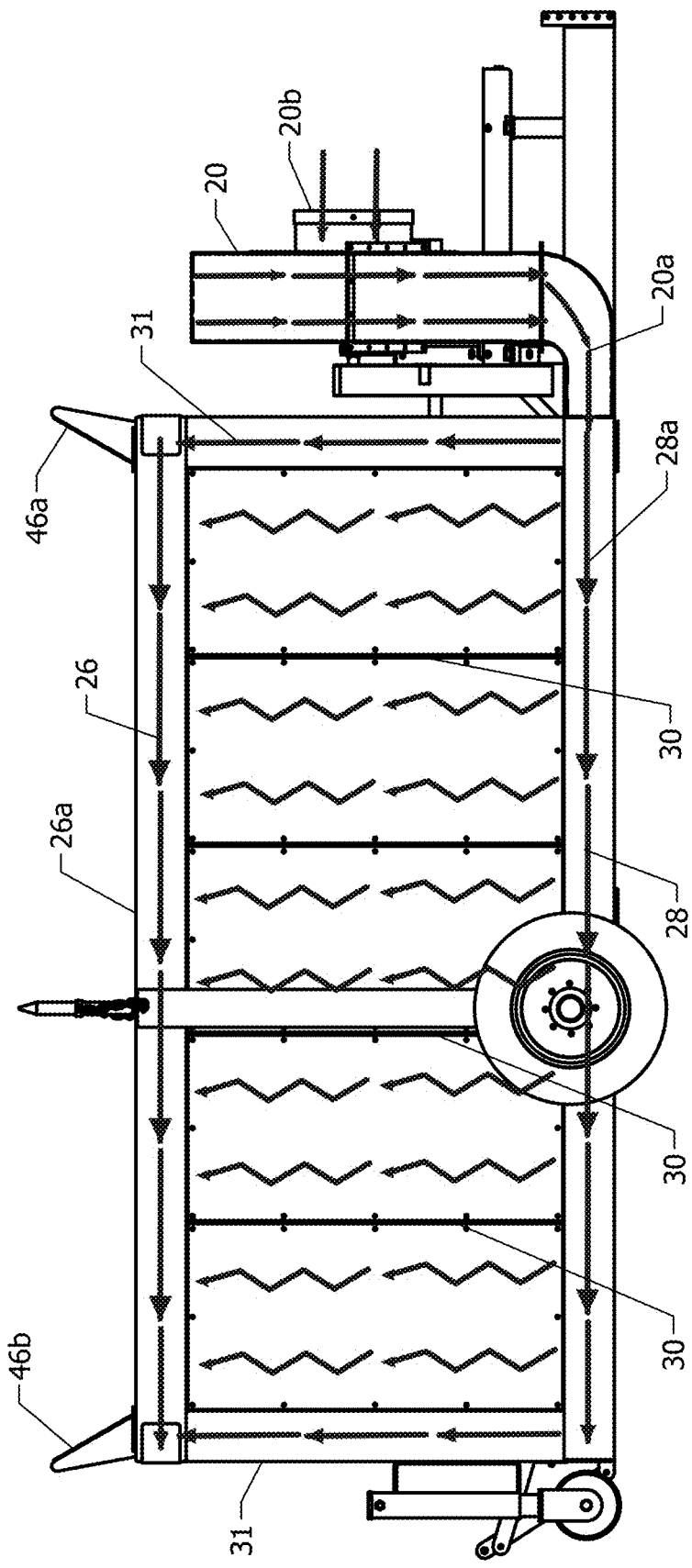
FIG. 13 is a second or left side view of the firebox of FIG. 1 with airflows indicated.
Figure 14:
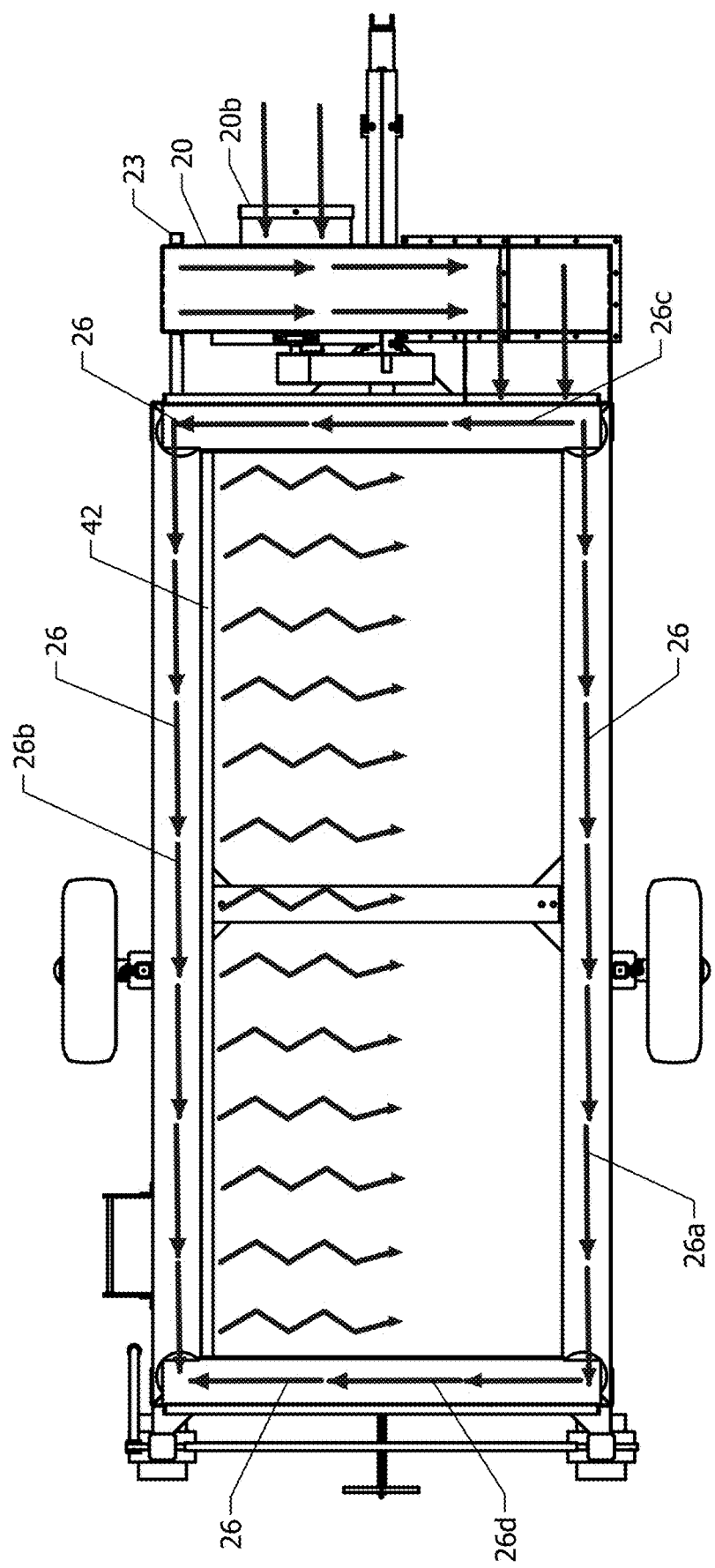
FIG. 14 is a top down view of the firebox of FIG. 1 with airflows indicated.
Figure 15:
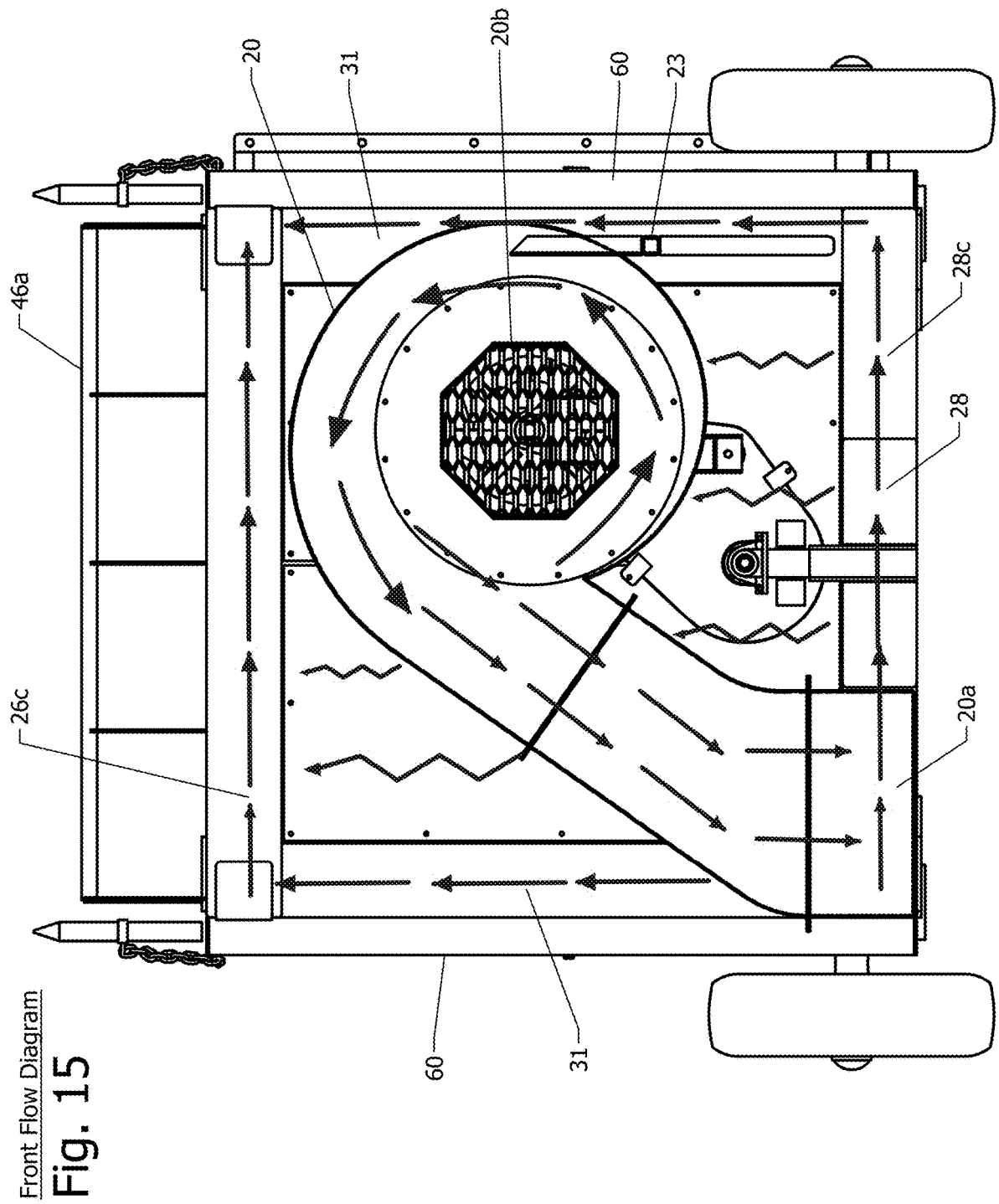
FIG. 15 is a front end view of the firebox of FIG. 1 with airflows indicated.
Figure 16:
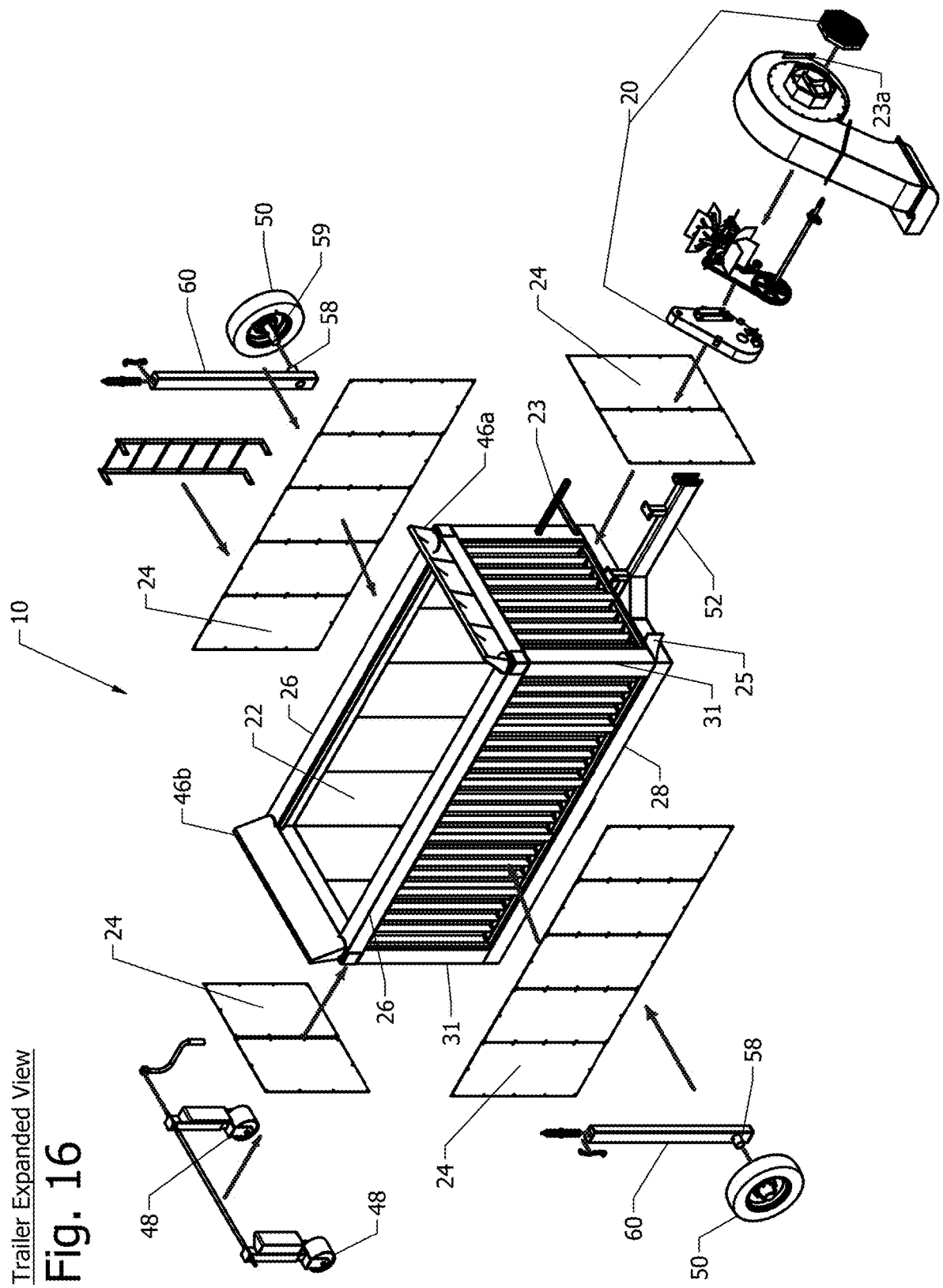
FIG. 16 is an exploded or expanded view of a trailer portion of the firebox of FIG. 1.

FIGS. 1-6 illustrate from various perspectives a firebox 10 embodying principles disclosed herein. FIGS. 7-10 illustrate sections of the firebox 10. FIGS. 11-12 illustrate and air curtain structure within the firebox. FIGS. 13-15 illustrate airflows through channels within the manifolds and double-paneled walls of the firebox 10. FIGS. 16-24 illustrate exploded or expanded views of components of the firebox 10.

The firebox 10 is configured to sit on ground or grade. Preferably the firebox 10 has an overall elongated rectangular shape in plan or top view with two ends 12 and 14 that have widths in the y direction that are relatively less than lengths in the x direction of longer sides 16 and 18, although other shapes are suitable, including, but not limited to, circular, triangular, trapezoidal, and square shapes. At the one end 12 is disposed a fan 20, described in greater detail below. Herein the end 12 can also be referred to as a front end, and the end 14 can be referred as a back end. As will become clearer below, when viewed from the front end 12, the side 16 can be referred to a right side and the side 18 can be referred to as a left side.

The firebox 10 includes an interior or fireside wall 22 defining an inner periphery and an exterior or outer wall 24 defining an outer periphery, with the inner periphery defining an interior space or burn chamber 10A. As can be appreciated, the peripheries can be divided into one or more segments in top or plan view depending upon the shape of the firebox in the plan view.

Preferably, as can best be seen in FIGS. 4, 7, 12, and 15, there is no bottom to the interior space or burn chamber 10A. Rather, the interior space 10A is exposed to the ground.

The walls 22 and 24 extend in the vertical or z-direction between an upper manifold 26 and a lower manifold 28. The term "manifold" means an enclosing structure in which can be constrained a flowing medium, e.g., air. Each manifold preferably is comprised of 8"×8"×3/16" tubular steel tubing, although other sizes such as 5"×5"3/16" steel tubes are contemplated. Preferably the manifolds are rectangular in cross-section, although other cross sectional shapes can be used, e.g., circular, polygonal, or triangular cross sectional shapes. Advantageously, the firebox does not need a refractory lining in the burn chamber 10A because of the way the interior wall 22 is cooled by flowing air as described below.

Figure 17:
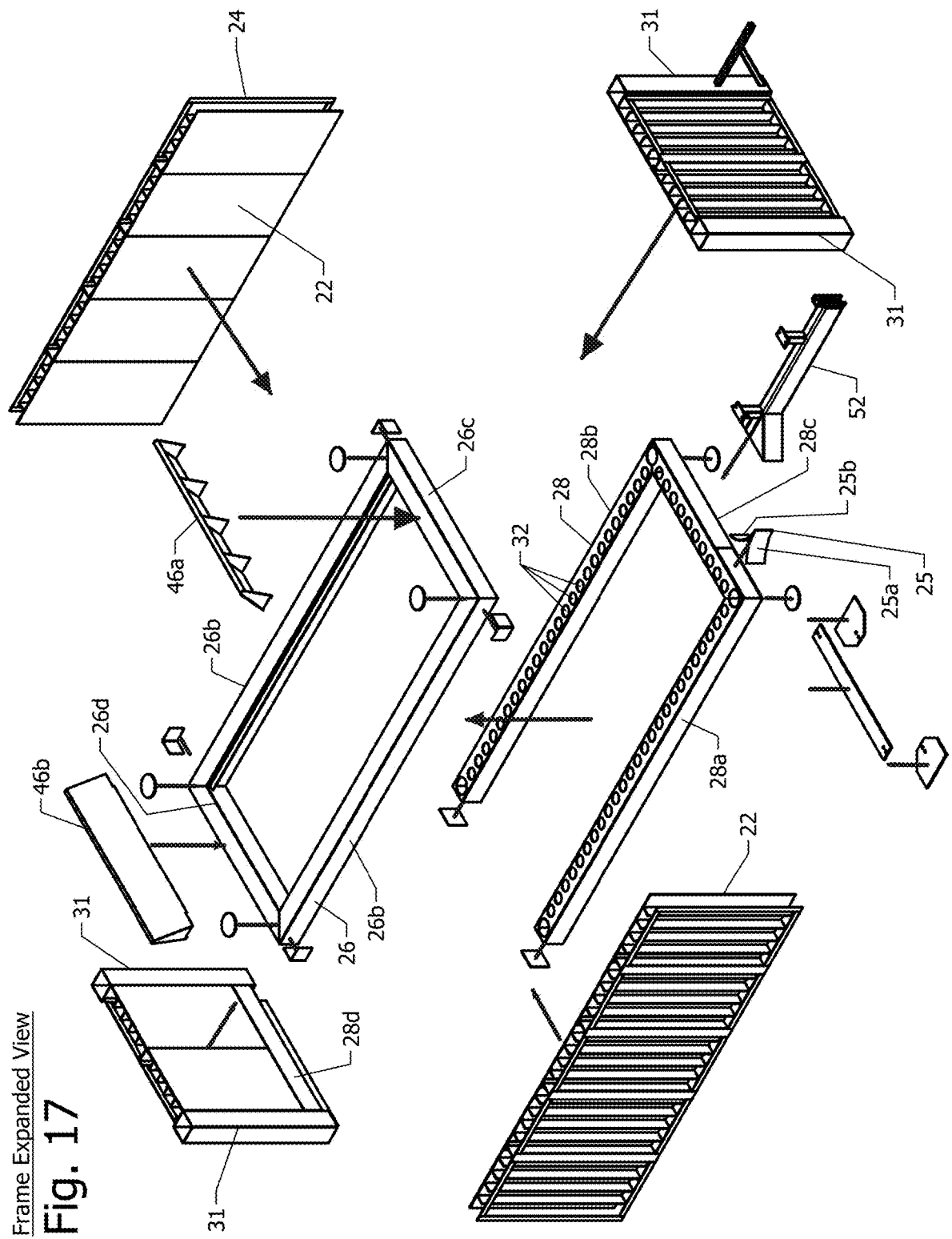
FIG. 17 is an exploded or expanded view of a frame portion of the firebox of FIG. 1.

As can be seen best in FIG. 17, the upper manifold 26 preferably defines a rectangle in plan view or top view, and thus can be said to be ring-shaped. The lower manifold 28, is slightly differently constructed as detailed below. The lower manifold 28 preferably has three main sections or segments defining a U-shape and a fourth segment that is displaced vertically to complete an overall ring-shape in plan view.

As such, the manifold 26 preferably is comprised of two lateral sections or segments 26a and 26b which extend from the front end 12 to the rear end 14, and two end sections or segments 26c and 26d which extend from the right side 16 to the left side 18. The sections 26a and 26b extend along the x-direction while the sections 26c and 26d extend along the y-direction and all, preferably, are in fluid communication.

Figure 19:
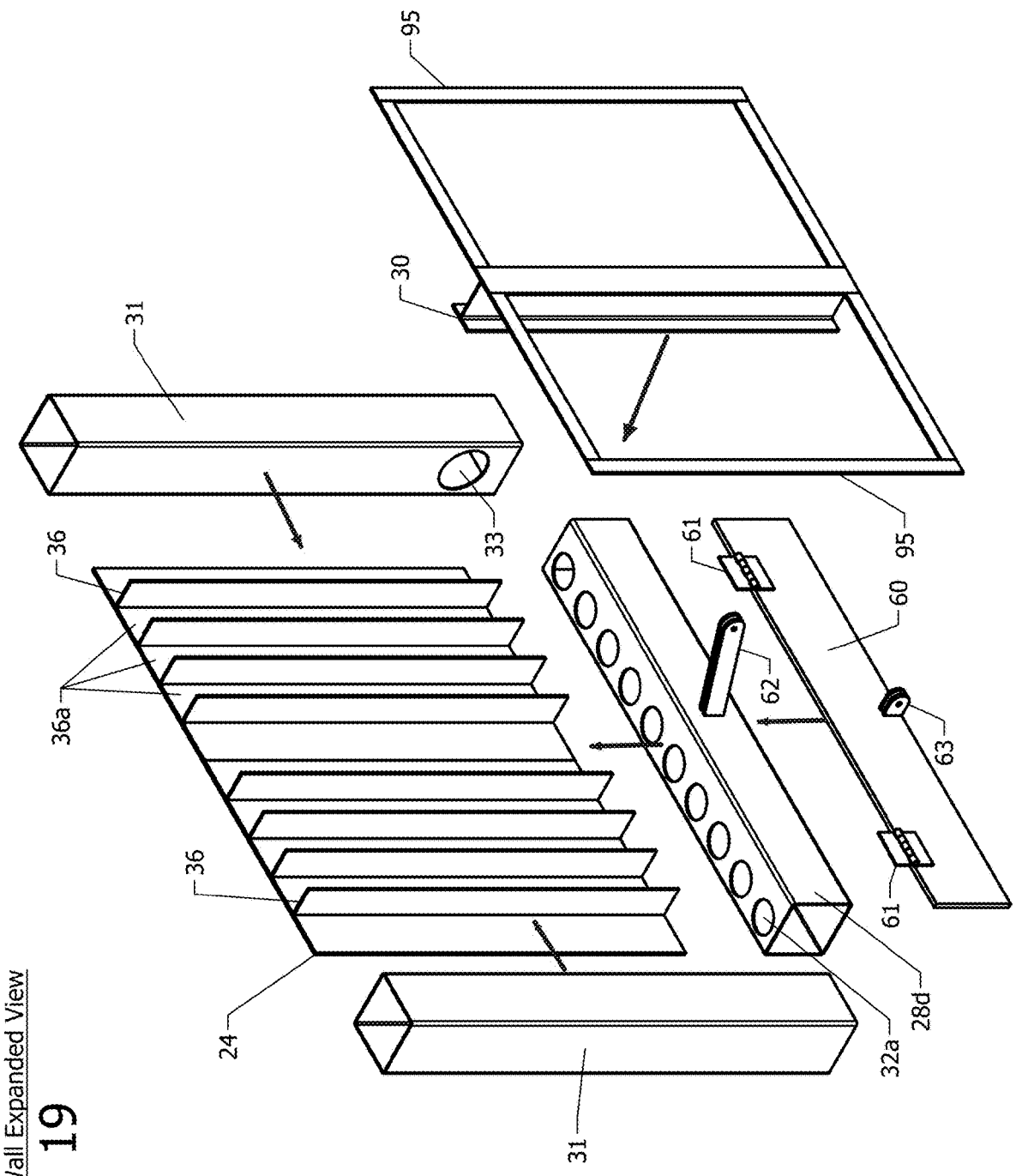
FIG. 19 is an exploded or expanded view of a back end wall of the firebox of FIG. 1.

The manifold 28 preferably is comprised of two lateral sections or segments 28a and 28b which extend from the front end 12 to the rear end 14, and one end section or segment 28*c* that extends from the right side 16 to the left side 18 along the front end 12 of the firebox. As best seen in FIGS. 17 and 19, the manifold 28 also includes an end section or segment 28*d* at the back end 14 of the firebox, but the section 28*d* is displaced vertically from the sections 28*a* and 28*b* to accommodate a gate structure, which provides an opening at ground level into the firebox. The sections 28*a* and 28*b* extend along the x-direction while the sections 28*c* and 28*d* extend along the y-direction and, preferably, all are in fluid communication.

The upper manifold 26 and the lower manifold 28 are separated by and fixed to opposite ends of columns 30. The columns 30 preferably are H-beams or I-beams, each with one flange facing the fireside wall 22 and the other flange facing the outer wall 24. The webs of the columns 30 serve to divide the space between the fireside wall 22 and the outer wall 24 into cells as described in greater detail below. In this embodiment, Two columns 30 are located at the opposite ends 12 and 14 of the firebox 10, each located half-way between two corners (see, e.g., FIGS. 17 and 18); and eight columns 30 located on the sides 16 and 18 of the firebox 10, with four columns 30 located on each side between the corners (see, e.g, FIG. 19). There are four tubular column structures 31 located at the corners of the firebox 10. Thus, there are a total of 14 vertical cells (extending between the manifold structure 28 and the manifold structure 26) defined by the webs of the columns 30. Of course, differently sized fireboxes may have different numbers of columns and different numbers of cells.

Preferably, the corner columns 31 are positioned on the lateral sections 28*a* and 28*b*, while the columns 30 located and the ends of the firebox are positioned on the end sections 28*c* and 28*d*. Thus, the columns and the corner columns extend between the upper manifold 26 and the lower manifold 28.

Figure 20:
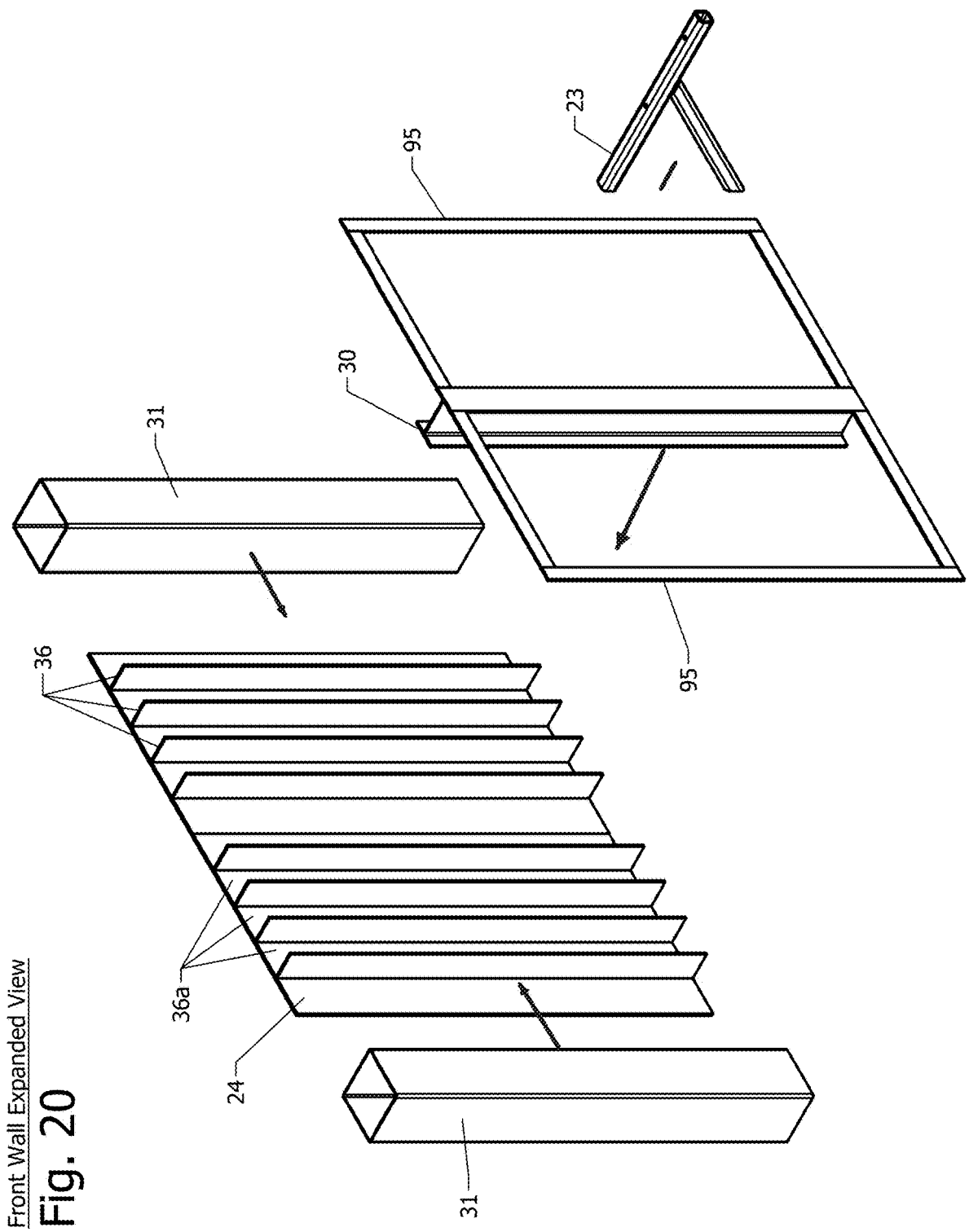
FIG. 20 is an exploded or expanded view of a front end wall of the firebox of FIG. 1.
Figure 21:
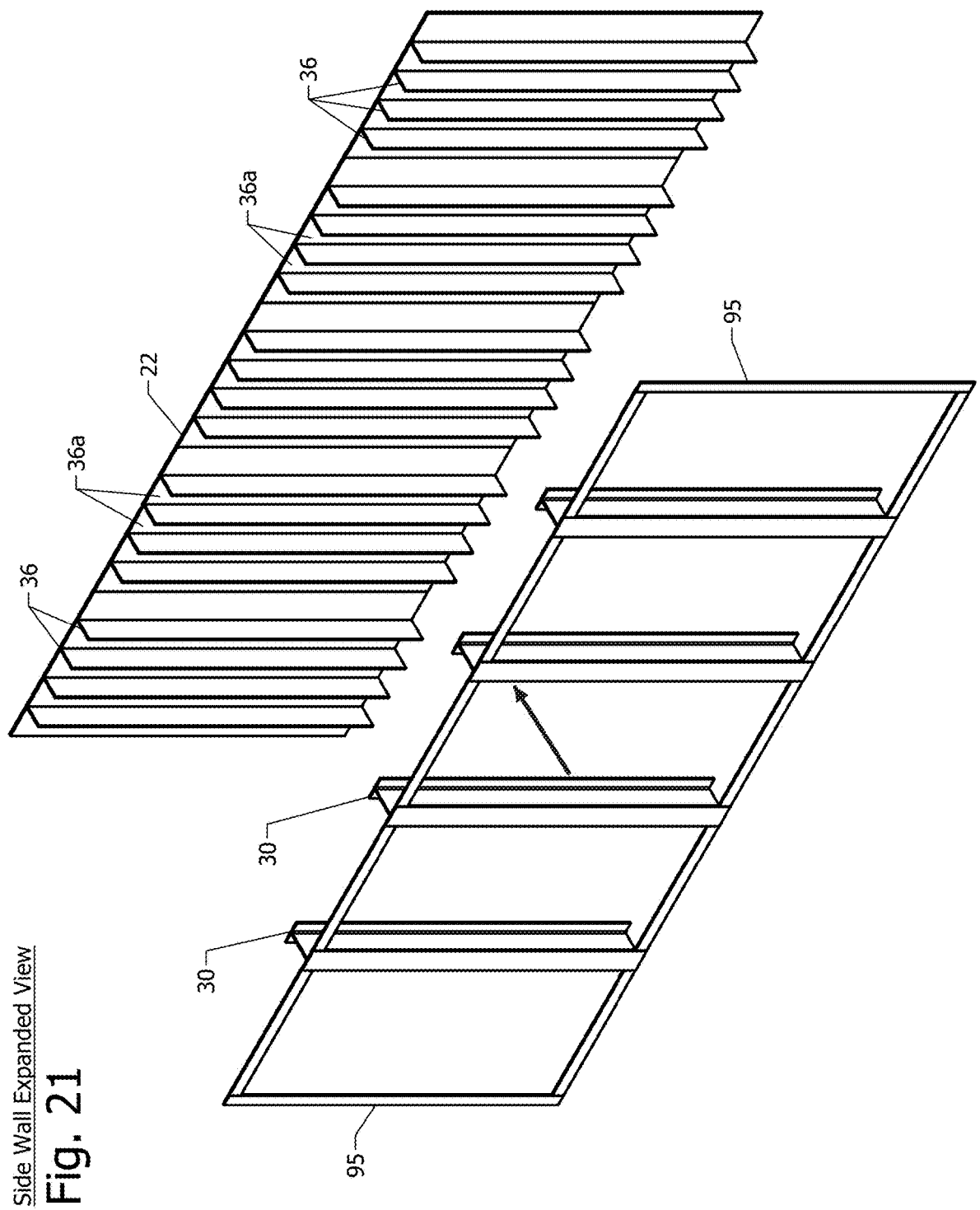
FIG. 21 is an exploded or expanded view of a side wall of the firebox of FIG. 1.

The fireside wall 22 preferably is comprised of 3/16"×30" 48" flat steel plates. The outer wall 24 preferably is comprised of a plurality of 1/8"×30"×48" flat steel plates. The fireside wall plates preferably are welded to the columns 30 with the seams between the plates centered on the columns 30. By being welded, leakage of air via the plates of the fireside wall 22 is minimized, if not prevented. In contrast, the outer wall plates 24 preferably are removably secured to the columns 30 by means of bolts and nuts. The nuts can be secured to the backside of the H-beam and frames 95 described next. Also, as illustrated in FIGS. 19-21, frames 95 comprised of horizontal and vertical flat steel bars are welded to the columns 30 and 31 and the manifolds 26 and 28, and the outer wall plates 24 are bolted to these frames 95. The outwardly facing sides the frames 95 are flush with the outwardly facing sides of the flanges of the columns 30. The plates of the outer wall 24 are removable to permit inspection of the space between the fireside wall 22 and the outer wall 24. Of course, the dimensions of the plates can vary depending on the size of the firebox.

Figure 18:
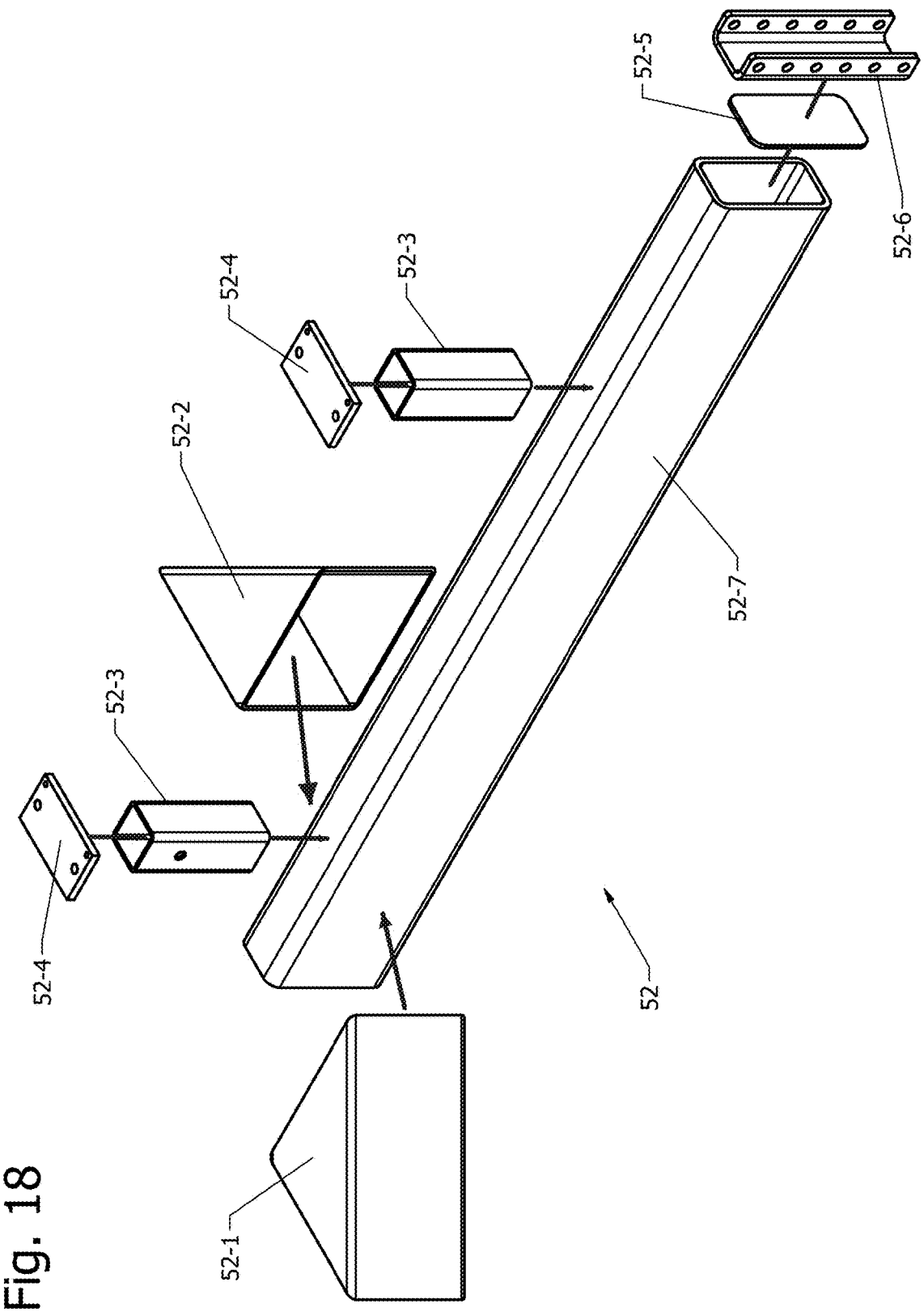
FIG. 18 is an exploded or expanded view of a trailer tongue portion of the firebox of FIG. 1.

In FIGS. 15, 17, and 18, the preferred corner columns 31 are shown. These corner columns 31 are tubular with rectangular, preferably square, horizontal cross sections. The corner columns 31 preferably are made of 8"×8"×3/16" tubular steel tubing.

Figure 7:
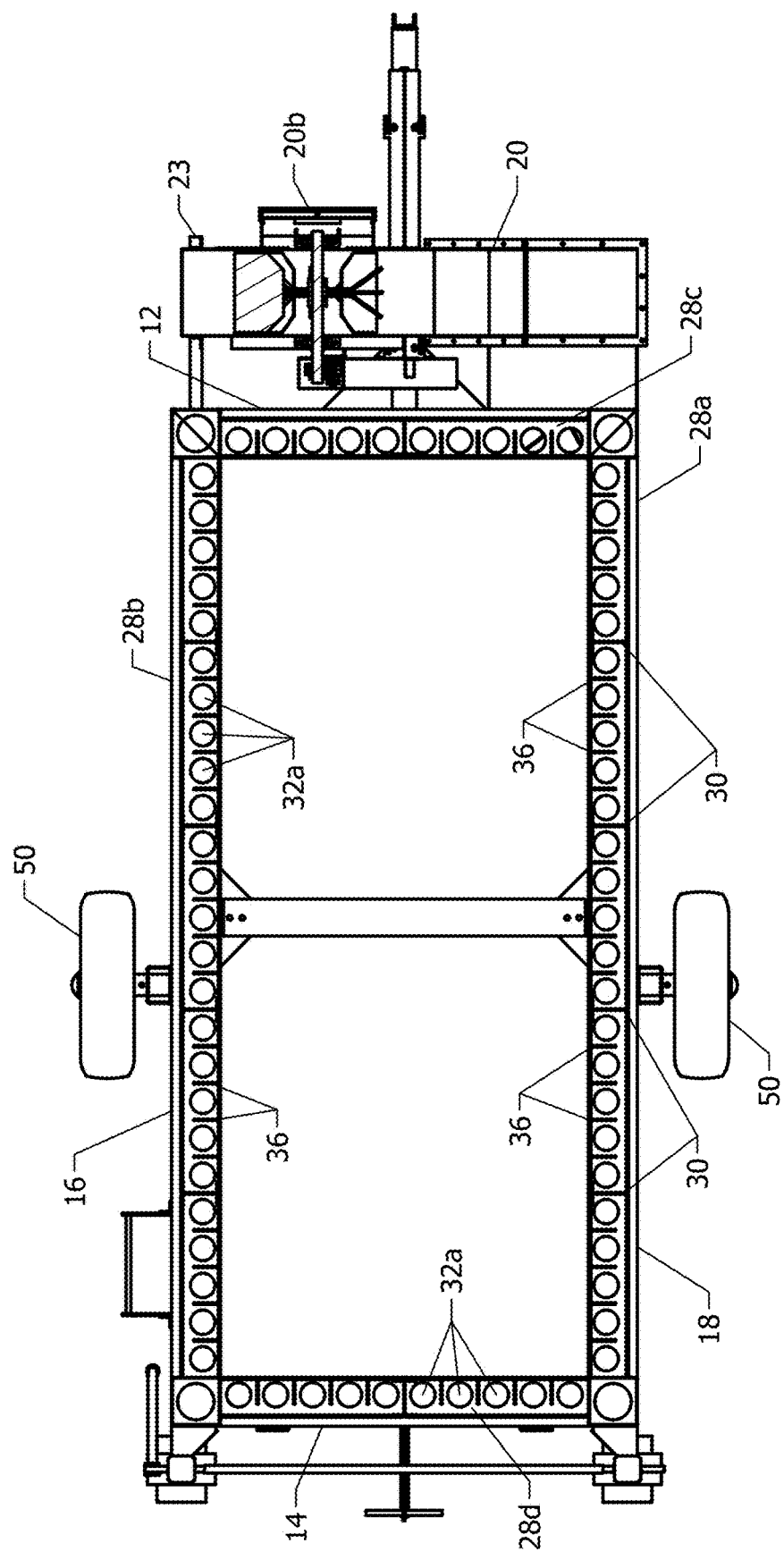
FIG. 7 is a top down section view of the firebox of FIG. 1 taken along the line VII-VII in FIG. 2 and showing cells between the double wall of the firebox.

With reference to FIGS. 7 and 17, it can be seen that the upper or top side of the lower manifold 28 includes a plurality openings 32*a* with a respective opening 32*a* in each cell. While circular openings 32*a* are visible, the openings 32*a* can also be of any shape, preferably elongated ovals. It is preferable to size and shape the openings to allow as much air as possible to flow from the lower manifold 28 into the cells. These openings provide for fluid communication of flowing air from the lower manifold into the cells formed by the columns 30 between the inner wall 22 and the outer wall 24.

Figure 8:
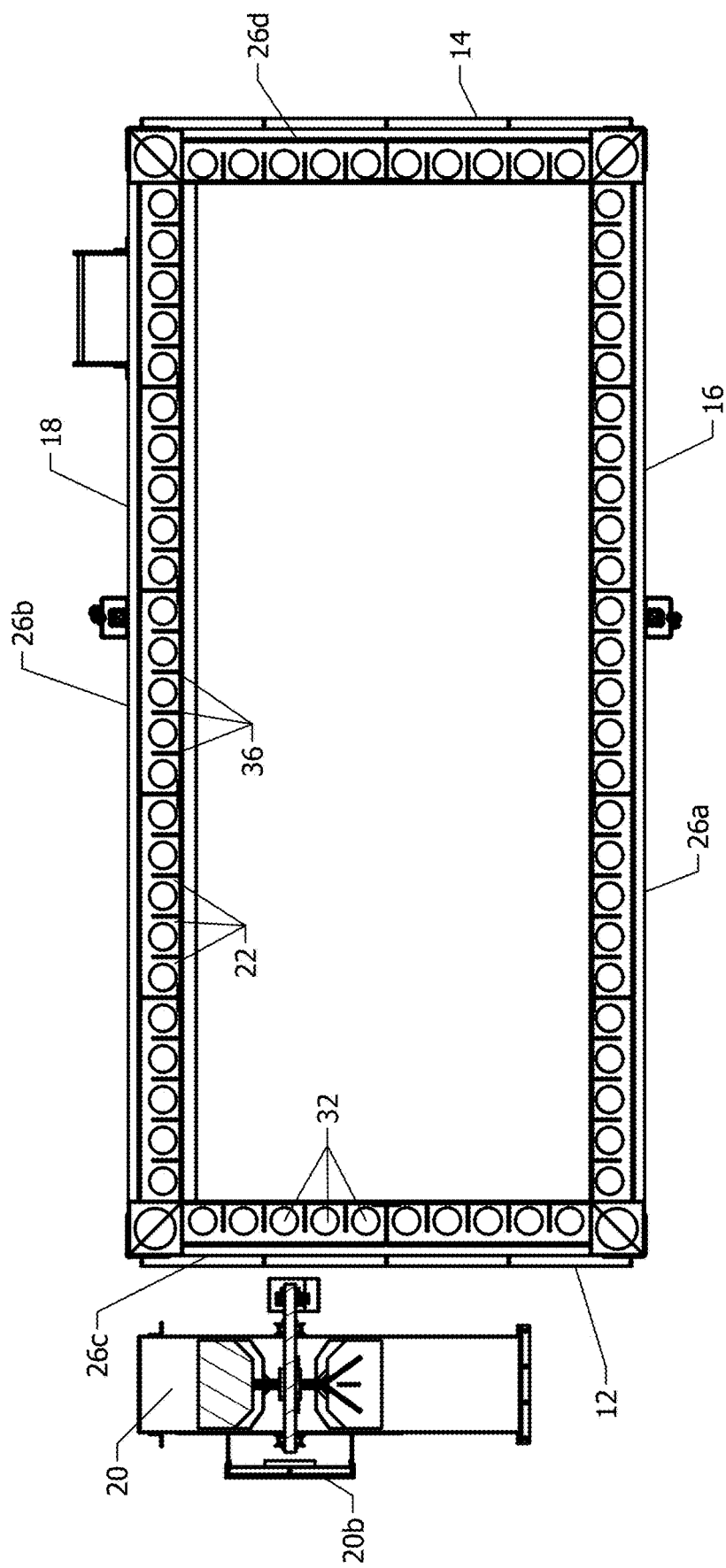
FIG. 8 is a bottom up section view of the firebox of FIG. 1 taken along the line VIII-VIII in FIG. 2 and showing cells between the double walls of the firebox.
Figure 9:
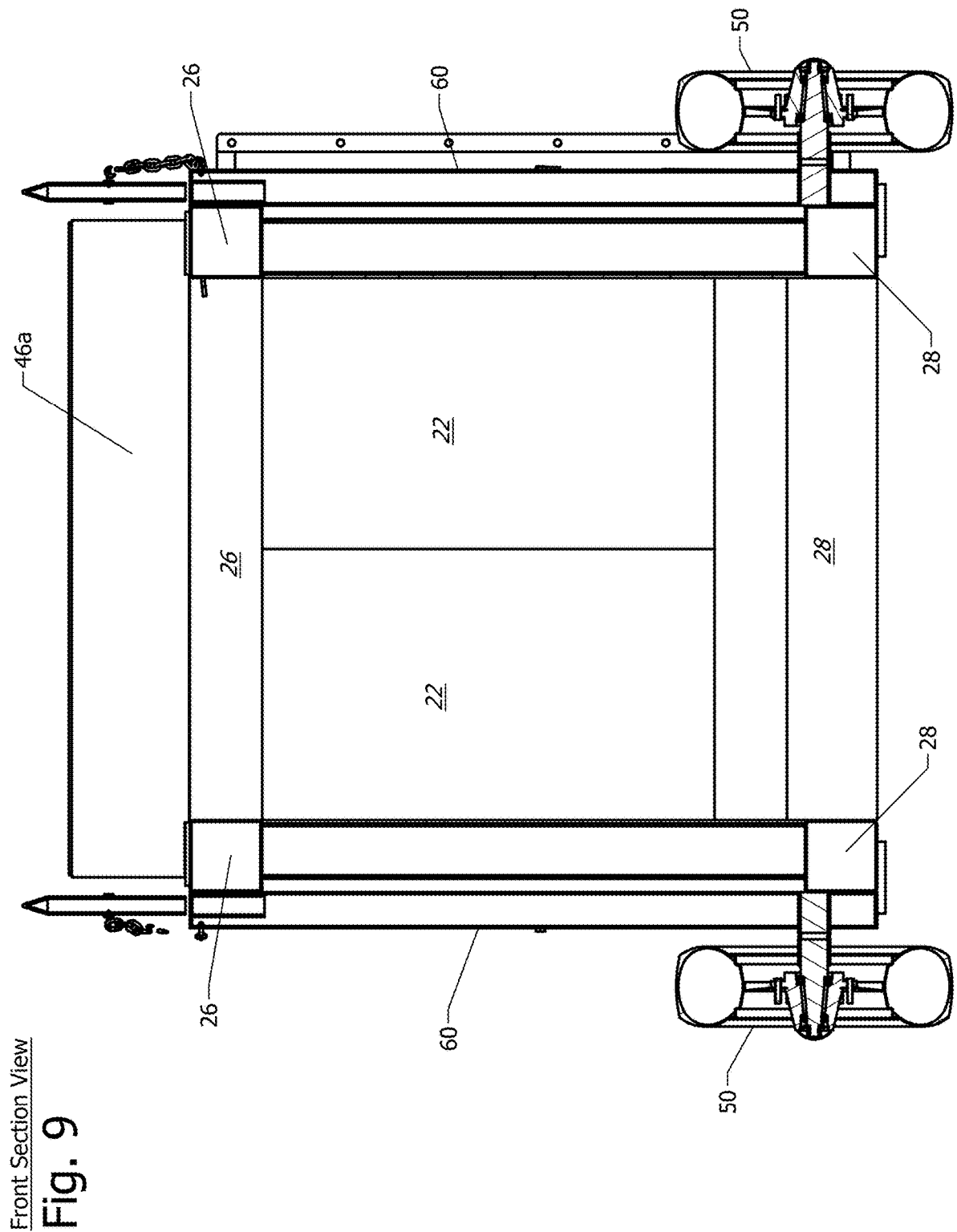
FIG. 9 is front section end view of the firebox of FIG. 1 taken along the line IX-IX in FIG. 4.
Figure 10:
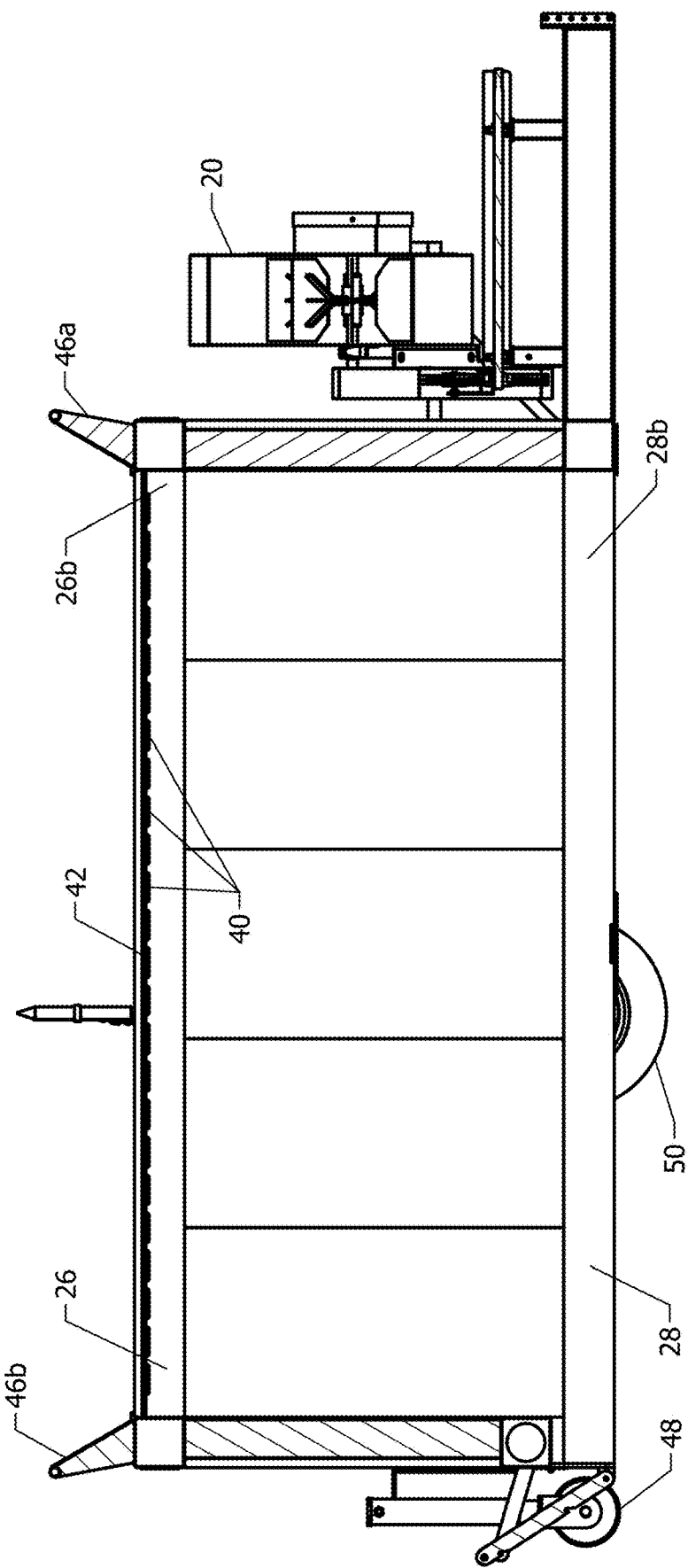
FIG. 10 is a side section view of the firebox of FIG. 1 taken along the line X-X in FIG. 4.

As can be seen in FIG. 8, it can be appreciated that the lower or bottom side of the upper manifold 26 includes similar openings 32*b* to permit fluid communication of flowing air from the cells into the upper manifold 26. Those similar opening also preferably are sized and shaped to allow as much air to flow in to the upper manifold 26 as possible. While circular openings 32*b* are visible, the openings 32*b* can also be of any shape, preferably elongated ovals. As such, the upper manifold 26, the cells, and the lower manifold 28 are all in fluid communication with each other.

Openings 32*c* are also provided at the ends of the lateral sections 28*a* and 28*b* and openings 32*d* are provided at the end of the lateral sections 26*a* and 26*b* to provide fluid communication between the lateral sections and the corner columns. Openings 32*c* and 32*d* can be sized differently or the same as the openings 32*a* and 32*b*.

With respect to the fan 20, the outlet of the fan is in fluid communication with the lower manifold 28 as shown in FIGS. 3, 5, 6, and 13-15 by means of fan housing outlet or ductwork 20*a*. The fan 20 includes an air intake 20*b* centered on an axel or shaft of the fan and faces the x or forward direction. To power the fan 20, a shaft 56 is coupled to the axle or shaft of the fan 20 by means of a pulley system that preferably includes a 4:1 reduction. Thus, rotation of the shaft 56 will cause the fan axle and blade to rotate 4 times faster than the shaft 56. However, other pulley reduction ratios can be employed depending on the air flow and pressure desired because the rotational speed of the fan blades will affect the air flow. The pulley system is shown in exploded view in FIG. 24 and described in more detail below.

The fan 20 is supported on and secured to the firebox by a shaft 23 extending horizontally from the front end of the firebox 10. This shaft 23 is seen best in FIGS. 6, 15, 16, and 20. The shaft 23 preferably is welded to a corner column 31 and includes a vertical extension 23*a* which in turn is secured, preferably by welding, to the housing of the fan 20. The fan housing is otherwise secured to the lower manifold 28 by the ductwork 20*a* which also serves to support the fan 20 on the firebox 10.

In FIG. 19, the preferred structure for the back end portion of the manifold 28 is depicted. As can be seen, preferably, to accommodate the inclusion of a swing gate 60, the end section 28*d* of the lower manifold 28 is displace vertically to above the lateral sections 28*a* and 28*b*. Accordingly, the corner columns 31 include lateral openings 33 that face respective ends of the end section 28*d* to provide fluid communication between the lateral sections 28*a* and 28*b* and the end section 28*d*. With this structure, the manifold 28 has a ring structure similar to that of the manifold 26.

Figure 2:
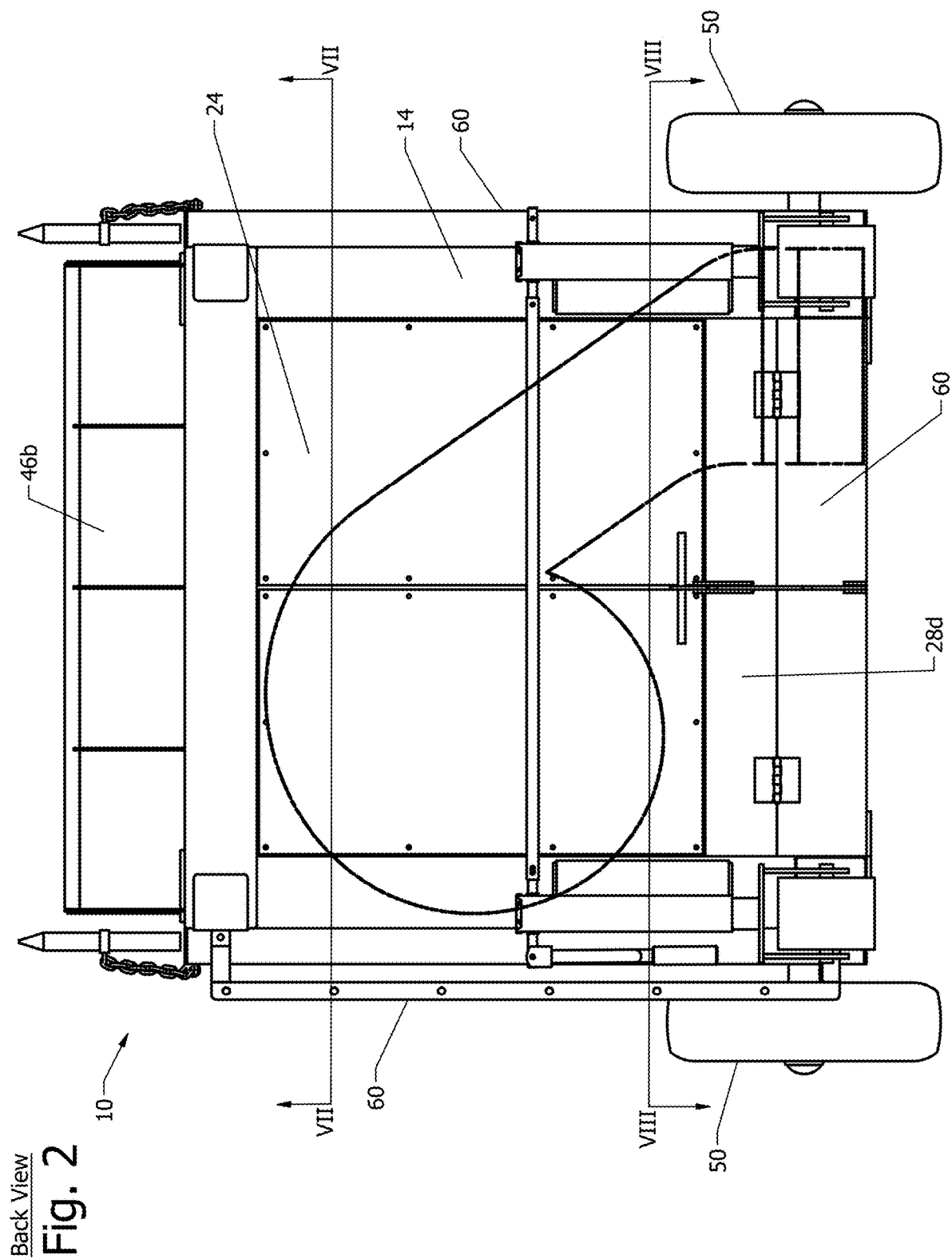
FIG. 2 is back end view of the firebox of FIG. 1.
Figure 3:
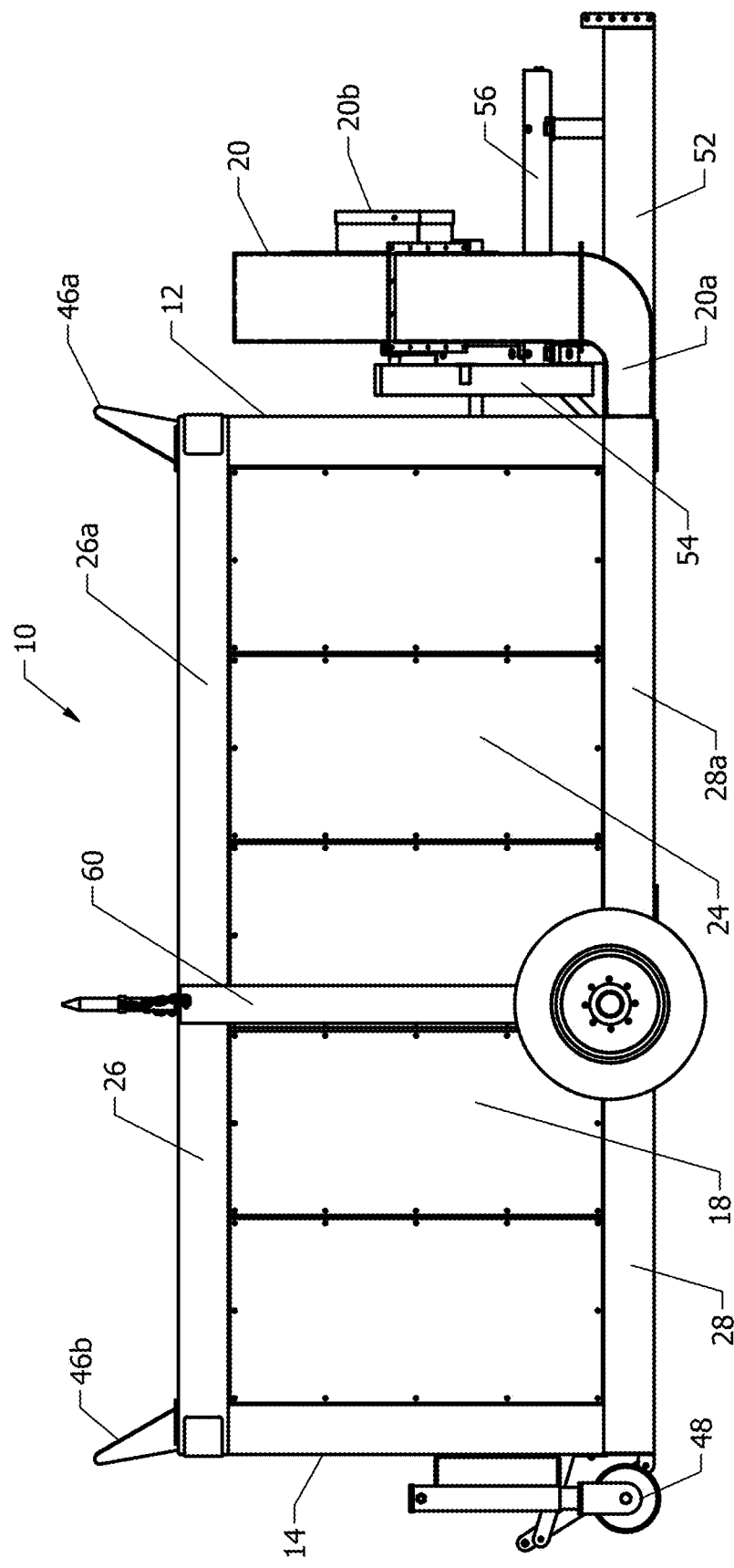
FIG. 3 is a second or left side view of the firebox of FIG. 1
Figure 4:
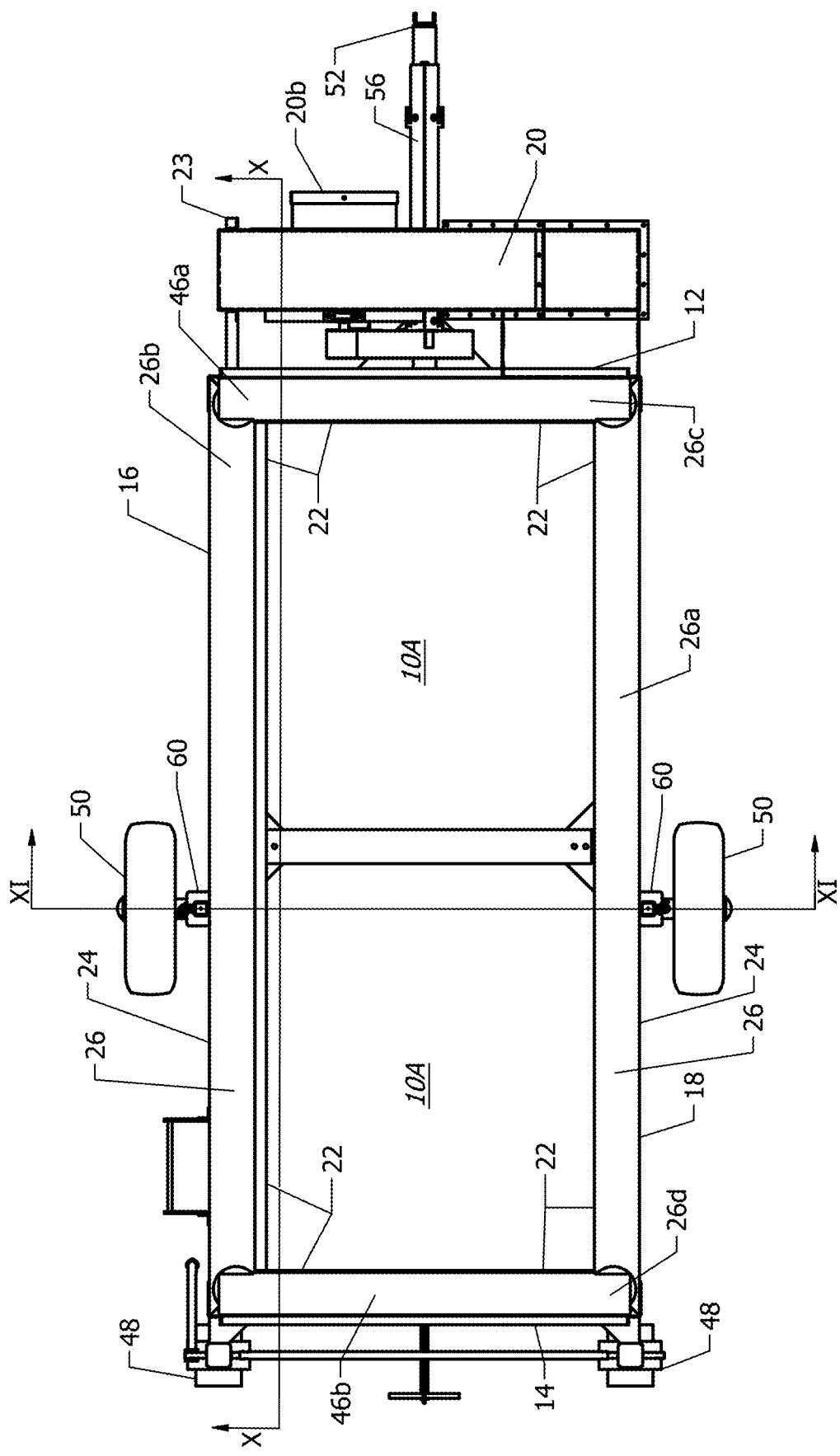
FIG. 4 is a top down view the firebox of FIG. 1.
Figure 5:
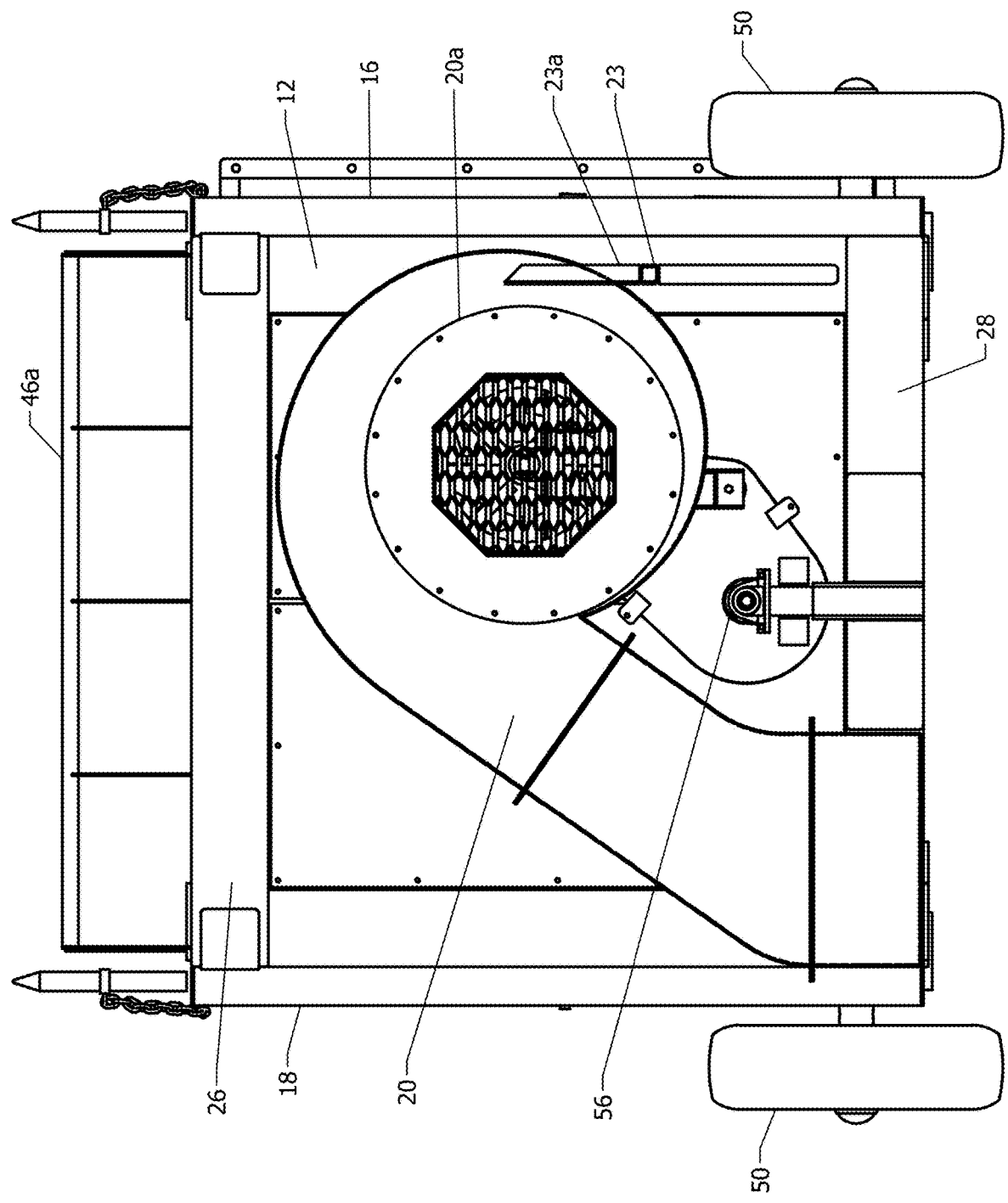
FIG. 5 is a front end view of the firebox of FIG. 1.
Figure 6:
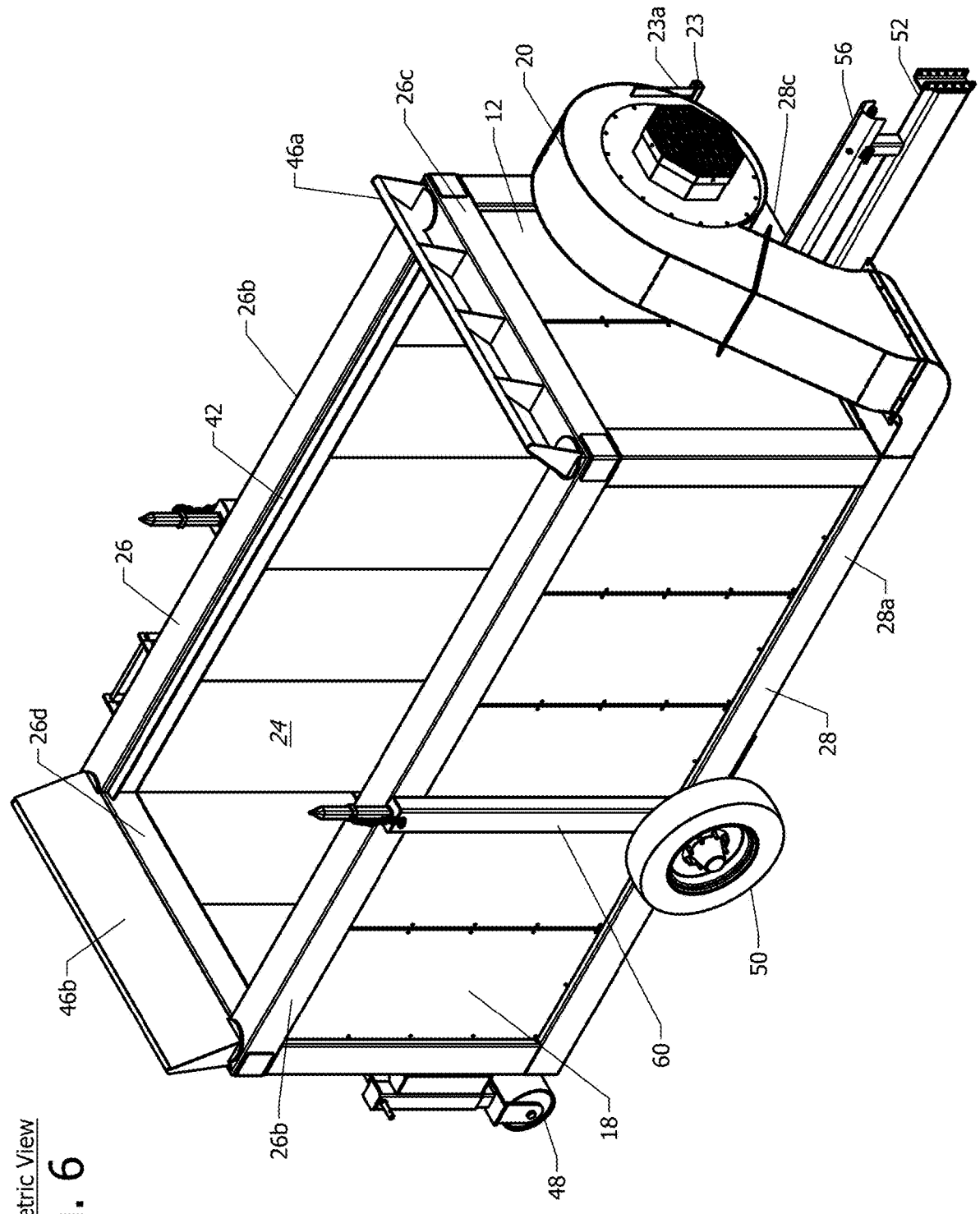
FIG. 6 is second isometric view of the firebox of FIG. 1 looking at the front end and left side thereof.

As can be seen in FIGS. 1, 2, and 19, the swing gate 60 is attached to the manifold end section 28*d* by means of two hinges 61. Also attached to the end section 28*d* on a side facing the firebox interior 10A is a gate support bar which juts into the interior space 10A. The gate support bar 62 includes openings for receipt of a pin. The swing gate to includes a relatively shorter stub that also includes openings for receipt of a pin. As can be appreciated, when the gate 60 is swung upward to an open position, the openings of the bar 62 and the stub 63 mate and a pin can be received through all of the openings to secure the gate 60 in an open position. As can also be appreciated, with the gate in an open position, should the firebox be trailered on the rollers 48, ash and the like can be allowed to escape the firebox, and the firebox can be moved.

In FIGS. 13-15, the flow of air from the fan 20 throughout the manifold s 26 and 28 and the cells between the wall 22 and 24 is illustrated. Again, air flows out from the fan 20 into lower manifold 28 at one corner thereof via the ductwork 20a, here the left side of the end section 28c. The air flow then divides between left side manifold lateral section 28b and manifold end section 28c by means of a flow divider 25 shown in FIGS. 16 and 17. Preferably, the flow divider 25 includes two oppositely curved walls or panels 25a and 25b to direct flowing air into to opposite directions. Other divider structures could be used such as to flat walls or panels.

From the end section 28c, the air will also flow into lateral section 28a. The air from lateral sections 28a and 28b flows into the corner column columns located on the ends of the lateral sections 28a and 28b. Due to the openings 33 in the rear side corner columns, air will also flow into the end section 28d. At the same time, due to the holes 32a in the top of the lower manifold 28 and the holes 32b in the bottom of the upper manifold 26, air flows upward to the manifold 26 via the cells defined between the fire-side wall 22 and the outer wall 24. As can be appreciated, due to the ring-shape of the upper manifold 26, the air will flow throughout the upper manifold 26 until it reaches the openings 40 in the upper manifold 26 facing the interior 10A of the firebox. At that point, the air exists the upper manifold 26 in the form of an air curtain as discussed below.

With reference again to FIGS. 7, 8, and 19-21 it can be seen that, preferably, a plurality of fins or ribs 36 are positioned in the spaces between the fireside wall 22 and the outer wall 24. These fins or ribs 36 may be secured by welds to the plates of the fireside wall 22 and extend in the z-direction or vertical direction. The fins or ribs 36 not only assist in channeling the flow or air, but also act as heat fins which transfer heat from the wall 22 to the air flowing through the cells from the lower manifold 28 to the upper manifold 26. The number and dimension of the fins 36 can vary depending upon the cooling and/or flow channeling performance desired.

The fins 36 effectively create sub-channels 36a between them. It can be appreciated that, preferably, each the sub-channels 36a defined between the fins 36, is aligned with a respective opening 32a and a respective opening 32b.

As mentioned previously, the fins 36, and to an extent the columns 30, act as heat dissipating fins and transfer heat from fires in the firebox to the air flowing through the channels. Thus, for very hot fires, the air can be superheated air as it exits the openings 40 in the form of an air curtain. The super heating further helps ensure greater combustion of the material in the firebox.

In a preferred embodiment, the fan 20 includes eight (8) 14 inch wide blades. The blades extend about 12 inches from the axle of the fan. The fan blades preferably are rotated about the axle at a rate of 2500-3000 revolutions per minute (RPMs).

The shaft 56 preferably is configured to be coupled to the power take off of, e.g., an agriculture or farm tractor so that the tractor can be used to power the fan. Tractor power take-offs are well known as are means for connecting to them and extracting mechanical power from them. Of course, the fan could be powered by other means such as a motor (electric or fuel powered) and the like. However, the tractor power take off system is convenient for farmers and other users of tractors who will need to employ the firebox to burn combustible material out in remote locations such as remote areas of farms or other fields. The size of the fan preferably is such that it can produce enough air flow to sufficiently cool the fireside wall 22 du a burn session and to produce an air curtain, as discussed below.

As can be appreciated, the upper manifold 26, lower manifold 28 and the cells defined by the fireside wall 22 and outer wall 24 provide a fairly closed space within which air can flow. However, the upper manifold 26 includes openings on a portion facing the interior space 10A of the firebox 10 via which air can exit the fairly closed space, to provide an air curtain of super-heated air. In this embodiment, the portion is the interior space 10A-facing side of the left side of the upper manifold 26.

To that end, as illustrated best in FIGS. 11 and 12, the firebox includes an air curtain generating structure comprised of openings 40 near a top of the interior wall of one side, here the right side 16, of the firebox. Positioned above the openings 40 is a blade 42 (flat steel bar) that extends from interior wall of the front end to the interior wall of the back end and that directs the air exiting the upper manifold 26 down into and across the interior space of the firebox. Preferably, the blade 42 is set at an angle relative to vertical so as to direct the exiting air not only mostly over the top of the interior space but also down into the interior space to a degree such that due to combustion of materials in the firebox, smoke and ash are captured by the air curtain and directed back into the interior space. Preferably, the angle is 6% downward relative to horizontal or 84% relative to vertical as shown best in FIG. 11. As a result, the emission of smoke and ash can be minimized.

The openings 40 can be any suitable shape, but preferably are elongated along the x direction and are as large as possible to permit a maximum outflow of heated air, and thus a stronger and flatter air curtain.

Other air directing structures may be used so long as the adequately direct flowing air over and into the interior space 10a. For example, a structure comprised of two parallel blades, one positioned above the openings 40 and one positioned below the openings 40 might be used. The two parallel blades might be held spaced apart by spacers. Air would be emitted between and directed by the blades.

With reference to FIGS. 1, 3, 4, 6, and 10, and 23, it can be seen that the firebox 10 preferably includes two steel rollers 48 located at the back end 14 of the firebox 10. Rollers such as rollers 48, and the ways in which the rollers can be raised or lowered raise or lower the back end 14 relative to ground or grade.

Figure 23:
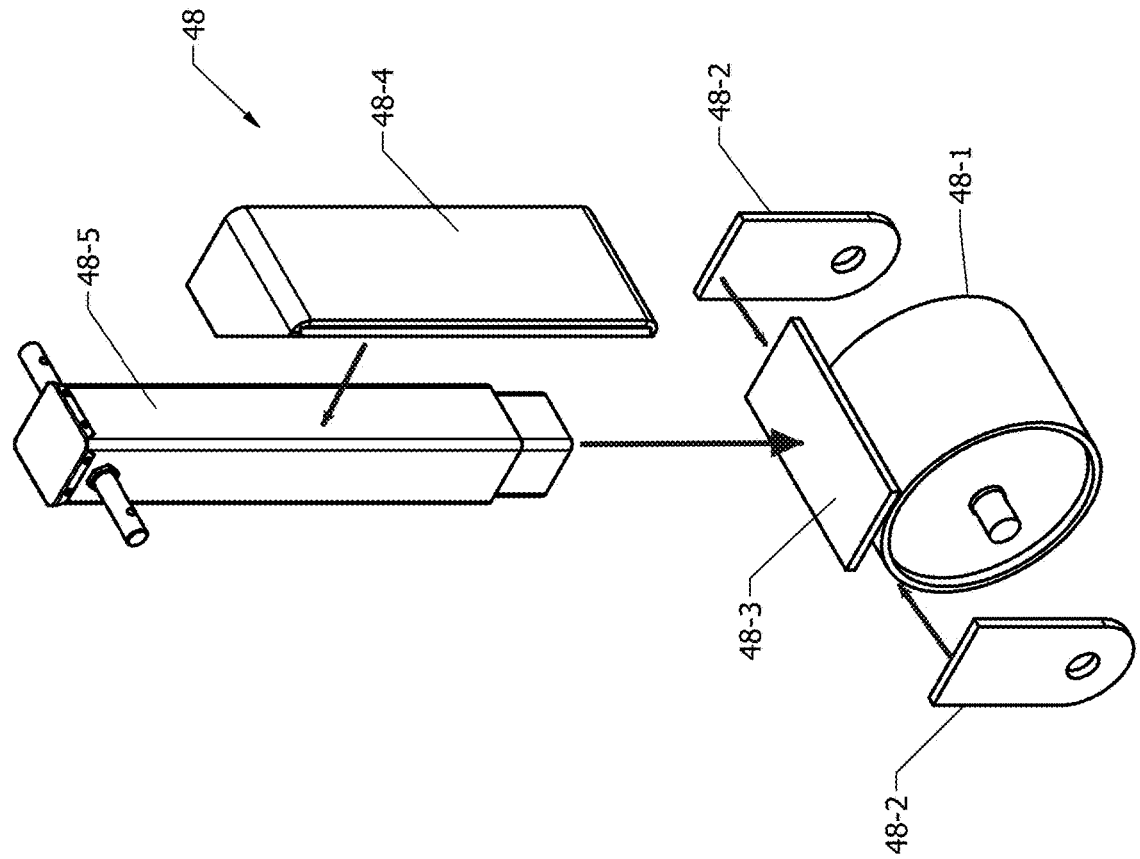
FIG. 23 is an exploded or expanded view of a jack roller of the firebox of FIG. 1.

In FIG. 23, the rollers 48 are shown in exploded view. Each roller 48 includes a ground roller or drum wheel 48-1 supported within a bracket made up of lateral-axle supporting bushing flanges 48-2 and plate 48-3. Together, the bushing flanges 48-2 and plate 48-3 form a bracket for the wheel. 48-1. Ends of the axle of the ground roller 48-1 are captured in busing openings in the bushing flanges 48-2. The bushing flanges 48-2 are attached to opposite ends of the plate 48-3. The plate 48-3 is in turn attached to a mount bracket 48-4 and a bulldog comprised of telescoping parts 48-5 and 48-6.

At the front end 12 of the firebox 10 is provided a hitch structure 52 which also carries the fan 20. This hitch structure is shown in greater detail in FIG. 18. As illustrated, hitch structure 52 preferably comprises a rectangular tubular beam 52-7 with corner pieces 51-1 and 52-2 which are all welded to each other and an outside of the front end 12 of the manifold 28. Attached to the beam 52-7, at separated positions along the beam, are two input bearing plates 52-4 via respective vertical stubs 52-3. At an outer end of the beam 52-7 is secured a hitch mount channel 52-6 via an end plate 52-5.

Firebox 10 also includes at least two braces or wheel columns 60 located midway along the two sides 16 and 18. These columns are welded to the firebox. Respectively attached to the braces 60 are hubs or sleeves 58 which are configured to receive removable trailer spindles 59 for wheels 50. The hubs or sleeves 58 are located sufficiently high in the vertical direction on the braces 60 so that without the wheels 50, the lower manifold 28 will sit directly on the ground. Trailer spindles and hubs/sleeves for trailer spindles are well known for other types of trailers.

As can be appreciated, the foregoing arrangement enable trailer of the firebox 10 when the wheels 50 are mounted. When the wheels 50 are removed and the rollers 48 are lowered, and the front end of the firebox is raised, e.g., by still being hitched to the hitch of a vehicle such as a tractor, the firebox can be trailered, at least for short distances. Thus, the firebox can be considered a mobile firebox.

It can easily be understood that the removability of the wheels 50 is highly advantageous to prevent heat damage to the wheels 50 due to use of the firebox 10 to combust or incinerate combustible material. However, use of wheels that can be raised or lowered can also be considered should the wheels not be subjected to or at risk of heat damage. Wheels that can be raised or lowered are use, e.g., on ice fishing houses.

As also shown, the firebox 10 preferably includes one or two containment or diverter fins 46A and 46B located at the ends 12 and 14 of the firebox on top of the upper manifold 26. These fins help contain smoke and ash as well as the air curtain.

Figure 22:
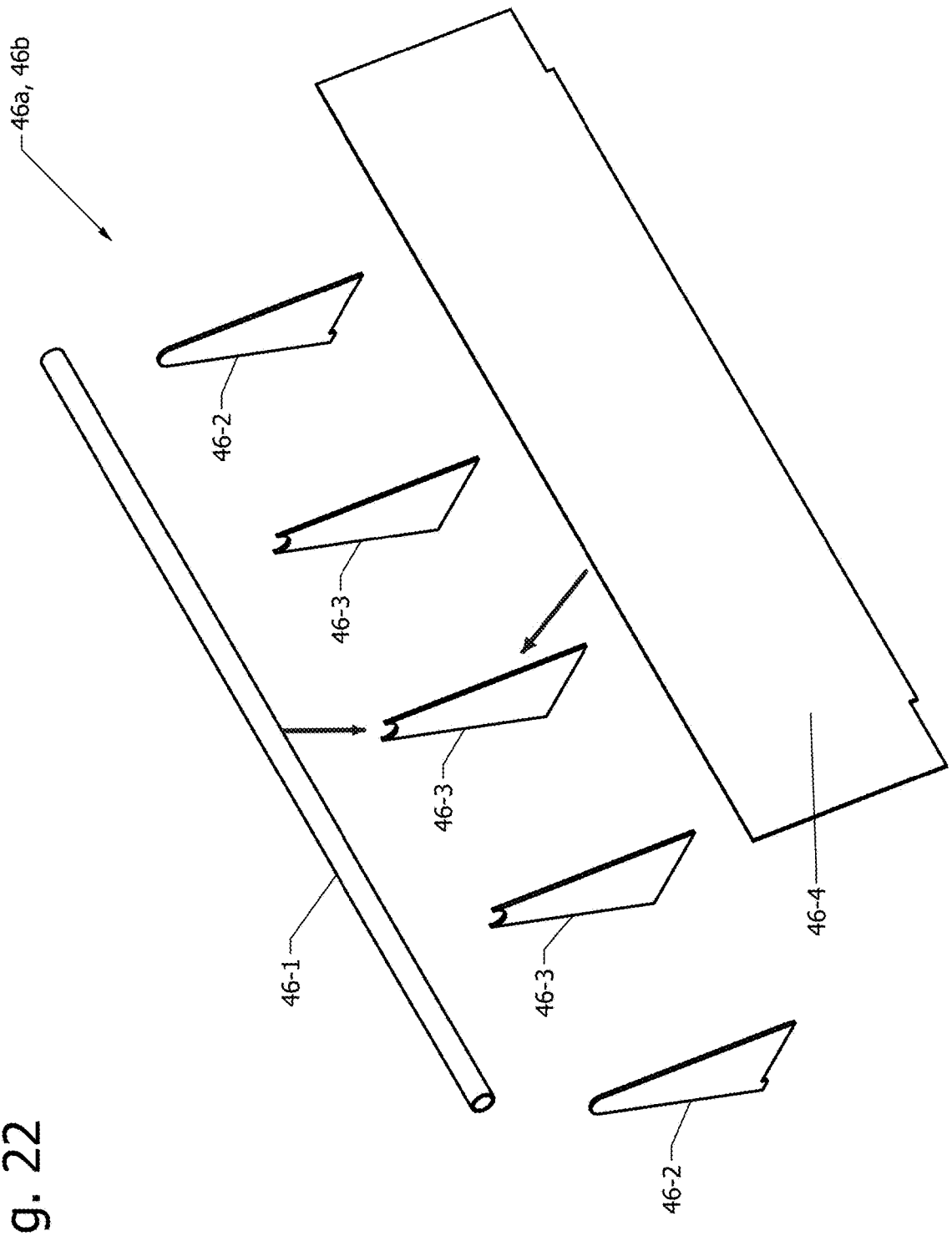
FIG. 22 is an exploded or expanded view of an airflow diverter of the firebox of FIG. 1.

In FIG. 22, a containment or diverter fin 46a or 46b structure is shown in exploded view. The structure includes a deflector plate 46-4 which is attached to a set of substantially triangular-shaped stiffeners comprised end plate stiffeners 46-2 positioned at opposite ends of the deflector plate 46-4 and intermediate stiffeners 46-3 positioned between the stiffener end plates 46-2. The stiffener plates preferably are welded to the deflector plate 46-4. A rolled steel bar 46-1 preferably extends between the end stiffener plates 46-2 and on top of one corner of the intermediate stiffener plates 46-3. The intermediate stiffener plates 46-2 preferably have semi-circular cutouts or recess in which the rolled steel bar can be received. The rolled steel bar preferably is welded to all of the stiffener plates.

Preferably the firebox can be filled ½ to ⅔ full with combustible material for incineration of the material.

Figure 24:
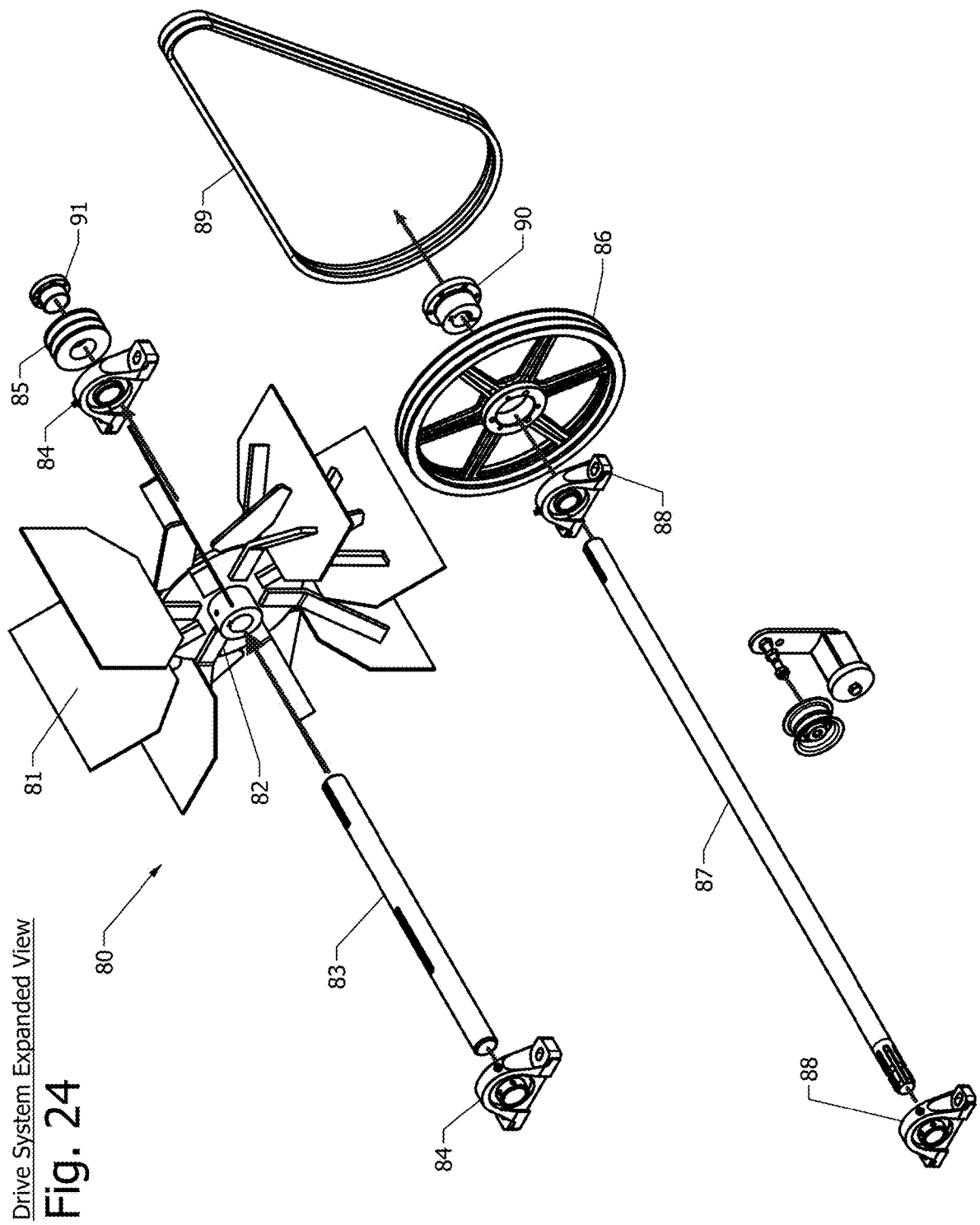
FIG. 24 is an exploded or expanded view of a drive system of a fan or blower of the firebox of FIG. 1.

In FIG. 24, the pulley arrangement or structure 80 for the fan 20 is illustrated in exploded view. As illustrated, the structure 80 includes a plurality of paddle blades 81 attached to a wheel 82. The wheel 82 is received on an axle or shaft 83 supported within bearings 84. A relatively smaller pulley wheel 85 is attached to one end of the axle 83. A bushing 91 secures the wheel 85 to the axle 83.

The arrangement 80 also includes a drive axle or shaft 87 (which is part of the drive connect 56) received within bearings 88 and 88. A relatively larger pulley wheel 86 is secured on one end of the axle or shaft 87 means of a bushing 90. A drive belt 89 is positioned about the wheels 85 and 86 and tensioned to effect driving of the fan and rotation of the paddle blades 81 when the axle or shaft 87 is driven. As noted above, the reduction ratio between the wheel 86 and the wheel 85 preferably is at least 4:1.

As can be appreciated, except for those parts that are removably secured to the firebox or a component thereof, e.g., the wheel spindles, the hinged rear door, the power take off shaft, the parts are securely welded in place, thereby provided a sturdy and robust structure.

The forgoing description of an implementation of the disclosure has been presented for the purpose of illustration and description. It is not exhaustive and does not limit the disclosure to the precise form disclosed. Modifications and variations are possible in light of the above teachings or may be acquired from practicing the disclosure. Accordingly, while various embodiments of the present disclosure may have been described, it will be apparent to those of skill in the art that many more embodiments and implementations are possible that are within the scope of this disclosure. Accordingly, the present disclosure is not to be restricted except in light of the attached claims and their equivalents.

What is claimed is:

1. A firebox comprising:
a manifold structure having four sides and comprising a four-sided upper manifold within which air can flow, a four-sided lower manifold within which the air can flow, and columns to which the upper manifold and the lower manifold are secured and which maintain the upper manifold and the lower manifold in spaced-apart relation, the manifold structure defining an interior space surrounded on four sides by the upper manifold and the lower manifold, and an exterior outside of the manifold structure;
a fireside wall secured to an interior side of the manifold structure;
an outer wall secured to an exterior side of the manifold structure; and
a fan in fluid communication with the manifold structure, wherein,
the fireside wall and the outer wall are spaced apart from each other and define cells between them and between the columns at all four sides of the manifold structure,
the cells are in fluid communication with the lower manifold and the upper manifold and are capable of channeling air flowing from the lower manifold to the upper manifold, and
a portion of the upper manifold includes openings on an interior side thereof which produce an air curtain over the interior space when air is communicated from the fan into the manifold structure.

2. The firebox of claim 1 wherein the outer wall comprises a plurality of outer panels that are removably secured to the manifold structure.

3. The firebox of claim 2, wherein the outer panels are removably secured to the columns.

4. The firebox of claim 1, wherein the fireside wall comprises a plurality of fireside panels that are permanently secured to the manifold structure.

5. The firebox of claim 4 wherein the fireside panels are permanently secured to the columns.

6. The firebox of claim 1, wherein the interior space is open to ground.

7. The firebox of claim 1, wherein the fireside wall, outer wall, and manifold structure are made of steel.

8. A firebox comprising:
a manifold structure comprising an upper manifold within which air can flow, a lower manifold within which the air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure;
a fireside wall secured to an interior side of the manifold structure;
an outer wall secured to an exterior side of the manifold structure; and
a fan in fluid communication with the manifold structure,
wherein,
the fireside wall and the outer wall are spaced apart from each other and define cells between them and between the columns,
the cells are in fluid communication with the lower manifold and the upper manifold and are capable of channeling air flowing from the lower manifold to the upper manifold,
within the cells are fins extending along a vertical direction between the lower manifold and the upper manifold, the fins being secured to the fireside wall and serving to channel the air flowing in the cells and to dissipate heat from the fireside wall to the air flowing in the cells, and
a portion of the upper manifold includes openings on an interior side thereof which produce an air curtain over the interior space when air is communicated from the fan into the manifold structure.

9. A firebox comprising:
a manifold structure comprising an upper manifold within which air can flow, a lower manifold within which the air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure;
a fireside wall secured to an interior side of the manifold structure;
an outer wall secured to an exterior side of the manifold structure;
a fan in fluid communication with the manifold structure;
a trailer hitch structure attached to the manifold structure, and
one or more sleeves attached to the manifold structure, the one or more sleeves capable of receiving two or more spindles of at least two wheels at opposite sides of the manifold structure such that the spindles and wheels are removable to allow the firebox to rest directly on ground,
wherein,
the fireside wall and the outer wall are spaced apart from each other and define cells between them and between the columns,
the cells are in fluid communication with the lower manifold and the upper manifold and are capable of channeling air flowing from the lower manifold to the upper manifold, and
a portion of the upper manifold includes openings on an interior side thereof which produce an air curtain over the interior space when air is communicated from the fan into the manifold structure.

10. A firebox comprising: a manifold structure comprising an upper manifold within which air can flow, a lower manifold within which the air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure, the firebox having four sides including a front side, a rear side, and two lateral sides;
a fireside wall secured to an interior side of the manifold structure;
an outer wall secured to an exterior side of the manifold structure;
a fan in fluid communication with the manifold structure
a trailer hitch structure attached to and extending from the front side of the firebox; and
one or more steel rollers located at the rear side of the firebox and which can be adjusted to lift or lower a rear end of the firebox relative to ground and whieh-allow for trailering of the firebox along the ground
wherein,
the fireside wall and the outer wall are spaced apart from each other and define cells between them and between the columns,
the cells are in fluid communication with the lower manifold and the upper manifold and are capable of channeling air flowing from the lower manifold to the upper manifold, and
a portion of the upper manifold includes openings on an interior side thereof which produce an air curtain over the interior space when air is communicated from the fan into the manifold structure.

11. A firebox comprising:
a manifold structure comprising an upper manifold within which air can flow, a lower manifold within which the air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure;
a fireside wall secured to an interior side of the manifold structure;
an outer wall secured to an exterior side of the manifold structure;
a fan in fluid communication with the manifold structure; and
a first pulley attached to an axle of the fan, a second pulley with another axle, a belt engaging both the first pulley and the second pulley, and a mechanical power input on the another axle via which mechanical power can be transferred to the first pulley via the second pulley,
wherein,
the fireside wall and the outer wall are spaced apart from each other and define cells between them and between the columns,
the cells are in fluid communication with the lower manifold and the upper manifold and are capable of channeling air flowing from the lower manifold to the upper manifold, and
a portion of the upper manifold includes openings on an interior side thereof which produce an air curtain over the interior space when air is communicated from the fan into the manifold structure.

12. A firebox comprising:
a manifold structure comprising an upper manifold within which air can flow, a lower manifold within which the air can flow, and columns to which the upper manifold and the lower manifold are secured and which maintain the upper manifold and the lower manifold in spaced-apart relation, the manifold structure defining an interior space surrounded by the upper manifold and the lower manifold, and an exterior outside of the manifold structure;

a fireside wall secured to an interior side of the manifold structure;

an outer wall secured to an exterior side of the manifold structure; and a fan in fluid communication with the manifold structure, wherein, the fireside wall and the outer wall are spaced apart from each other and define cells between them and between the columns, the cells are in fluid communication with the lower manifold and the upper manifold and are capable of channeling air flowing from the lower manifold to the upper manifold, the columns includes include tubular columns in fluid communication between the upper manifold and the lower manifold, and a portion of the upper manifold includes openings on an interior side thereof which produce an air curtain over the interior space when air is communicated from the fan into the manifold structure.

* * * * *